United States Patent
Yamashita et al.

[11] Patent Number: 5,969,005
[45] Date of Patent: Oct. 19, 1999

[54] INK FOR INK JET RECORDING AND INK JET RECORDING METHOD

[75] Inventors: Yoshiro Yamashita, Manami Ashigara; Ken Hashimoto; Hiroshi Inoue, both of Minami Ashigara, all of Japan

[73] Assignee: FUJI XEROX Co., LTD, Tokyo, Japan

[21] Appl. No.: 08/889,134

[22] Filed: Jul. 7, 1997

[30] Foreign Application Priority Data

Jul. 8, 1996 [JP] Japan ................................ 8-177599

[51] Int. Cl.$^6$ .................................................. C09D 11/10
[52] U.S. Cl. .................................. 523/161; 260/DIG. 38; 524/522; 524/523; 106/31.86; 347/100
[58] Field of Search .................... 523/161; 260/DIG. 38; 524/522, 523; 106/31.86; 342/100

[56] References Cited

U.S. PATENT DOCUMENTS

| | | | |
|---|---|---|---|
| 5,133,803 | 7/1992 | Moffatt | 106/31.37 |
| 5,161,145 | 11/1992 | Ogawa et al. | 369/59 |
| 5,416,145 | 5/1995 | Askeland et al. | 524/190 |
| 5,529,617 | 6/1996 | Yamashita et al. | 106/20 R |

FOREIGN PATENT DOCUMENTS

| | | |
|---|---|---|
| B2-60-34992 | 8/1985 | Japan . |
| A-62-11781 | 1/1987 | Japan . |
| B2-62-13388 | 3/1987 | Japan . |
| A-63-132083 | 6/1988 | Japan . |
| A-1-230685 | 9/1989 | Japan . |
| A-3-41171 | 2/1991 | Japan . |
| A-6-136306 | 5/1994 | Japan . |
| WO 93/18103 | 9/1993 | WIPO . |

*Primary Examiner*—Marion McCamish
*Assistant Examiner*—John J. Guarriello
*Attorney, Agent, or Firm*—Oliff & Berridge, PLC

[57] ABSTRACT

The present invention provides an ink which provides an image with a sufficient image density free from bleeding and unevenness, dries rapidly on paper and can be jetted at a high reliability and a recording method using said ink. A novel ink for ink jet recording comprising water, a coloring material and a water-soluble organic solvent is provided, characterized in that said ink comprises a polymer containing a carboxyl group having an average molecular weight of from 1,000 to 20,000 in the free or salt state in an amount of from 0.1 to 3% by weight, a water-soluble organic compound which normally stays solid and vaporizes in a proportion of not less than 50% by weight at a temperature of from 100° C. to 350° C. in an amount of from 1 to 20% by weight, and a compound represented by the following formula (A):

$$R\!-\!O\!-\!X_nH \qquad (A)$$

wherein R represents a functional group selected from the group consisting of $C_{4-8}$ alkyl, alkenyl, alkinyl, phenyl, alkylphenyl, alkenylphenyl and cycloalkyl groups; X represents an oxyethylene or oxypropylene group; and n represents an integer of from 1 to 4 in an amount of from 1 to 20% by weight, and said ink exhibits a surface tension of from 20 to 40 mN/m and a pH value of not less than 7.5. The ink is jetted at an output of from 1 to 70 ng per droplet to effect recording.

23 Claims, No Drawings

INK FOR INK JET RECORDING AND INK JET RECORDING METHOD

FIELD OF THE INVENTION

The present invention relates to a novel ink and ink jet recording method for use in ink jet process recording apparatus such as printer, copying machine, facsimile and word processor.

BACKGROUND OF THE INVENTION

Because of its advantages such as small size, inexpensiveness and noise-free operation, a so-called ink jet recording apparatus which is adapted to jet a liquid or molten solid ink through a nozzle, slit, porous film or the like against paper, cloth, film or the like to effect recording has been extensively studied. In recent years, besides black monochromatic printers capable of recording on so-called ordinary paper such as report blank form and duplicating paper with a good print quality, many printers capable of recording in all colors have been commercially available and thus played an important role in the art of recording apparatus.

An ink for use in these ink jet recording apparatus is mainly composed of a solvent, a coloring material and additives. An ink for ink jet recording method has the following requirements:

(1) It must provide a high resolution, high density uniform image which does not run or fog on paper;
(2) When dried at the tip of the nozzle, it must cause no nozzle clogging, providing invariably good jetting response and stability;
(3) It must be easily dried on paper;
(4) It must provide an image with a good fastness;
(5) It must have a good storage stability.

In particular, various measures have heretofore been devised for the requirements (1) and (3). For example, JP-A-63-132083 (The term "JP-A" as used herein means an "unexamined published Japanese patent application") discloses a method which comprises the use of 10% and 30% solutions of a solid substance such as polyethylene glycol, aliphatic acid and salt thereof having a molecular weight of not less than 300, the viscosity ratio of which is 1:3 or more, to provide a thickened ink which causes less bleeding. U.S. Pat. No. 5,133,803 discloses a method for inhibiting bleeding which comprises the use of a high molecular colloidal substance having a molecular weight of not less than 10,000 such as alginic acid, carboxymethylcellulose and carrageenan. JP-A-6-136306 discloses a method which comprises using a high molecular substance having a molecular weight of from 3,000 to 50,000 to define the surface tension and viscosity of the ink to a predetermined range that can accomplish both the desired fixability and prevention of bleeding. However, these inks disclosed are disadvantageous in that they provide uneven image, dry slowly, tend to clog the orifice or, if used in a recording process which comprises the action of heat energy to jet the ink, cause an output drop. These problems are particularly remarkable in a high resolution small drop print ink jet recording method.

Further, JP-B-60-34992 (The term "JP-B" as used herein means an "examined Japanese patent publication"), JP-A-62-11781, JP-B-62-13388, JP-A-1-230685, JP-A-3-41171 disclose a method which comprises the addition of a surface active agent, a polyvalent alcohol derivative or the like to enhance the dryability of the ink on paper. However, the inks disclosed in these patents are disadvantageous in that they tend to run on paper and penetrate into paper, causing the drop of image density. Thus, no inks which provide a highly color-developed image with a good print quality on ordinary paper, dry rapidly on paper and can be jetted with a high reliability have been found.

SUMMARY OF THE INVENTION

As mentioned above, various measures for eliminating image bleeding have heretofore been proposed. However, none of these measures can go so far as to fully satisfy the requirements for recording materials on which image bleeding tend to occur. Further, as mentioned above, the method which comprises the enhancement of the dryability of the ink tends to cause image bleeding. It is therefore an object of the present invention to provide an ink which provides an image with a sufficient image density free from bleeding and unevenness, dries rapidly on paper and can be jetted at a high reliability to satisfy all the requirements for ink for ink jet recording and a recording method using said ink.

The foregoing object of the present invention will become more apparent from the following detailed description and examples.

The inventors made extensive studies of solution to the foregoing problems. As a result, it was found that the incorporation of a compound represented by the following formula (A), a polymer containing a carboxyl group in the free or salt state and a water-soluble organic compound which normally stays solid and vaporizes in a proportion of not less than 50% by weight at a temperature of from 100° C. to 350° C. in an ink for ink jet recording comprising as essential ingredients water, a water-soluble organic solvent and a coloring material in a predetermined amount makes it possible to provide the ink with a predetermined surface tension and pH value that allows the ink to be jetted with a good reliability, form a high density uniform image free from bleeding and dry rapidly on paper. Thus, the present invention has been worked out.

The present invention concerns an ink for ink jet recording comprising as essential ingredients water, a coloring material and a water-soluble organic solvent, characterized in that said ink comprises a polymer containing a carboxyl group having an average molecular weight of from 1,000 to 20,000 in the free or salt state in an amount of from 0.1 to 3% by weight, a water-soluble organic compound which normally stays solid and vaporizes in a proportion of not less than 50% by weight at a temperature of from 100° C. to 350° C. in an amount of from 1 to 20% by weight, and a compound represented by the following formula (A):

$$R-O-X_nH \qquad (A)$$

wherein R represents a functional group selected from the group consisting of $C_{4-8}$ alkyl, alkenyl, alkinyl, phenyl, alkylphenyl, alkenylphenyl and cycloalkyl groups; X represents an oxyethylene or oxypropylene group; and n represents an integer of from 1 to 4, and said ink exhibits a surface tension of from 20 to 40 mN/m and a pH value of not less than 7.5.

The present invention also concerns an ink jet recording method which comprises jetting a droplet of an ink comprising water, a coloring material and a water-soluble organic solvent through an orifice in response to a recording signal to effect recording, characterized in that as said ink there is used the foregoing ink for ink jet recording.

DETAILED DESCRIPTION OF THE INVENTION

Embodiments of the present invention will be further described hereinafter.

An ink for ink jet recording comprises water, a coloring material and a water-soluble organic solvent as essential ingredients. The ink for ink jet recording of the present invention needs to further comprise (1) from 0.1 to 3% by weight of a polymer containing a carboxyl group having an average molecular weight of from 1,000 to 20,000 in the free or salt state, (2) from 1 to 20% by weight of a water-soluble organic compound which normally stays solid and vaporizes in a proportion of not less than 50% by weight at a temperature of from 100° C. to 350° C., and (3) from 1 to 20% by weight of a compound represented by the foregoing formula (A). The incorporation of these three ingredients (1) to (3) in an ink for ink jet recording in combination makes it possible to obtain an ink for ink jet recording which provides a sufficient image density free from bleeding and unevenness.

The foregoing component (1) will be further described hereinafter. In the present invention, as the polymer containing a carboxyl group in the free or salt state there is preferably used a copolymer of a hydrophobic α,β-unsaturated ethylene monomer and a hydrophilic monomer containing a carboxyl group in the free or salt state to obtain an image free from bleeding.

Examples of the copolymer of a hydrophobic α,β-unsaturated ethylene monomer and a hydrophilic monomer containing a carboxyl group in the free or salt state include random copolymer, block copolymer, graft copolymer and alternating copolymer of an α,β-unsaturated ethylene compound such as aliphatic olefin, aromatic olefin, unsaturated carboxylic acid ester, unsaturated sulfonic acid ester, unsaturated phosphoric acid ester, unsaturated carboxylamide, unsaturated ketone, unsaturated nitrile and halogenated olefin and a monocarboxylic acid such as acrylic acid, methacrylic acid, crotonic acid, vinylacetic acid, pentenic acid and methylpentenic acid, dicarboxylic acid such as maleic acid, methylmaleic acid and itaconic acid, tricarboxylic acid such as 1-propene-1,2,3-tricarboxylic acid or salt thereof. Examples of paired (counter) ion of carboxyl group in the polymer containing a carboxyl group in the salt state include an alkaline metal, $NH_4^+$, and onium compound such as organic ammonium, phosphonium, sulfonium, oxonium, stibonium, stannonium and iodonium. An alkaline metal or $NH_4^+$ is preferred taking into account the dissolution stability and safety.

Preferred among the foregoing polymers is a copolymer comprising in combination a hydrophobic moiety selected from the group consisting of styrene, acrylic ester and methacrylic ester and a hydrophilic moiety containing a carboxyl group in the free or salt state selected from the group consisting of acrylic acid, methacrylic acid and maleic acid from the standpoint of improvement in image quality.

In particular, the molar ratio of the hydrophobic α,β-unsaturated ethylene monomer constituting the hydrophobic moiety to the hydrophilic monomer containing a carboxyl group in the free or salt state constituting the hydrophilic moiety is preferably from 4:1 to 1:4 by mol. If the molar ratio of the hydrophobic moiety exceeds the above defined range, the dissolution stability of the polymer with respect to the ink is deteriorated. On the contrary, if the molar ratio of the hydrophilic moiety exceeds the above defined range, the desired effect can be hardly exerted.

The foregoing polymer may further comprise hydrophilic monomer units other than the hydrophilic moiety containing a carboxyl group in the free or salt state. Examples of the other hydrophilic monomer units include compounds obtained by the addition of oxyethylene and/or oxypropylene to carboxylic acids such as acrylic acid and methacrylic acid, styrenesulfonic acid, salt thereof, naphthalenesulfonic acid, salt thereof, and compounds obtained by the addition of oxyethylene and/or oxypropylene to sulfonic acids.

In the present invention, the average molecular weight of the foregoing polymer needs to be from 1,000 to 20,000, preferably from 1,500 to 10,000. The term "average molecular weight" as used herein is meant to indicate "weight-average molecular weight". If the average molecular weight of the polymer exceeds 20,000, the resulting polymer can easily clog the orifice, though showing almost the same effect of inhibiting bleeding. On the contrary, if the average molecular weight of the polymer falls below 1,000, the resulting polymer can hardly be thickened and thus exerts a reduced effect of inhibiting bleeding.

Referring now to the component (2), examples of the water-soluble organic compound which normally stays solid but vaporizes in a proportion of not less than 50% by weight at a temperature of from 100° C. to 350° C. include organic acid ester, organic acid amide, organic acid ammonium salt, thioester, thioamide, carbonic acid ester, carbonic acid amide, phosphoric acid ester, phosphoric acid amide, amino acid and betaine having a molecular weight of less than 200. The term "normally" as used herein is meant to indicate "in the vicinity of 25° C.". The term "to vaporize in a proportion of not less than 50% by weight at a temperature of from 100° C. to 350° C." as used herein is meant to indicate "to show a weight drop of not less than 50% when heated from 100° C. to 350° C. at a rate of 20° C./min. as determined by thermogravimetric analysis". In the present invention, the percent vaporization of these compounds needs to be not less than 50% by weight. The higher the percent vaporization is, the higher is the effect of improving image quality, and the higher is the effect of eliminating the amount of deposit on the heater in the case where a system of allowing heat energy to act on the ink to jet the ink is employed. Therefore, a water-soluble organic compound which vaporizes in a proportion of not less than 65% is preferably used. If safety is taken into account in addition to the foregoing respects, urea and derivatives thereof are desirable. Examples of the urea derivatives include N-methylurea, N,N'-dimethylurea, N,N'-diethylurea, and ethyleneurea.

The component (3) is a compound represented by the following formula (A):

$$R-O-X_nH \quad \quad (A)$$

wherein R represents a functional group selected from the group consisting of $C_{4-8}$ alkyl, (preferably $C_{4-8}$) alkenyl, (preferably $C_{4-8}$) alkinyl, phenyl, (preferably $C_{6-8}$) alkylphenyl, (preferably $C_{6-8}$) alkenylphenyl and (preferably $C_{6-8}$) cycloalkyl groups; X represents an oxyethylene or oxypropylene group; and n represents an integer of from 1 to 4. Examples of the compound represented by the foregoing formula (A) include ethylene glycol monobutylether, diethylene glycol monobutylether, propyleneglycol monobutylether, diethyleneglycol monohexylether, dipropyleneglycol monobutylether, triethyleneglycol monobutylether, triethyleneglycol monohexylether, diethyleneglycol monocyclohexylether, triethyleneglycol monophenylethylether, and dioxypropylene oxyethylene monopentylether.

In the present invention, the polymer containing a carboxyl group in the free or salt state as component (1) needs to be incorporated in the ink composition in an amount of from 0.1 to 3% by weight, preferably from 0.5 to 1.5% by weight. If the amount of the polymer to be incorporated exceeds 3% by weight, the resulting ink can clog the orifice more easily. On the contrary, if the amount of the polymer to be incorporated falls below 0.1% by weight, the desired effect cannot be exerted. The water-soluble organic compound which normally stays solid and vaporizes in a proportion of not less than 50% by weight at a temperature of from 100° C. to 350° C. as component (2) needs to be incorporated in the ink composition in an amount of from 1 to 20% by weight, preferably from 2 to 10% by weight. If the content of the foregoing compound exceeds 20% by weight, the resulting ink exhibits too high a viscosity to be jetted stably. On the contrary, if the content of the foregoing compound falls below 1% by weight, the desired effect cannot be exerted. The compound represented by the foregoing formula (A) as component (3) needs to be incorporated in the ink composition in an amount of from 1 to 20% by weight, preferably from 2 to 10% by weight. If the content of the foregoing compound exceeds 20% by weight, the resulting ink not only causes more bleeding but also cannot be jetted stably. On the contrary, if the content of the foregoing compound falls below 1% by weight, the desired effect cannot be exerted.

The ink for ink jet recording of the present invention comprising the foregoing components (1) to (3) incorporated therein comprises water, a coloring material and a water-soluble organic solvent as essential ingredients. As such a coloring material there may be used various dyes, pigments, an oil emulsion colored with various dyes, pigments or oil-soluble dyes or colored polymer, wax or the like. Preferred among these coloring materials are water-soluble dyes. Particularly preferred among these water-soluble dyes are anionic dyes. Specific examples of such anionic dyes include C. I. direct black 2, C. I. direct black 4, C. I. direct black 9, C. I. direct black 11, C. I. direct black 17, C. I. direct black 19, C. I. direct black 22, C. I. direct black 32, C. I. direct black 80, C. I. direct black 151, C. I. direct black 154, C. I. direct black 168, C. I. direct black 171, C. I. direct black 194, C. I. direct blue 1, C. I. direct blue 2, C. I. direct blue 6, C. I. direct blue 8, C. I. direct blue 22, C. I. direct blue 34, C. I. direct blue 70, C.I. direct blue 71, C. I. direct blue 76, C. I. direct blue 78, C. I. direct blue 86, C. I. direct blue 112, C. I. direct blue 142, C. I. direct blue 165, C. I. direct blue 199, C. I. direct blue 200, C. I. direct blue 201, C. I. direct blue 202, C. I. direct blue 203, C. I. direct blue 207, C. I. direct blue 218, C. I. direct blue 236, C. I. direct blue 287, C. I. direct red 1, C. I. direct red 2, C. I. direct red 4, C. I. direct red 8, C.I. direct red 9, C. I. direct red 11, C. I. direct red 13, C. I. direct red 15, C. I. direct red 20, C. I. direct red 28, C. I. direct red 31, C. I. direct red 33, C. I. direct red 37, C. I. direct red 39, C. I. direct red 51, C. I. direct red 59, C. I. direct red 62, C. I. direct red 63, C. I. direct red 73, C. I. direct red 75, C. I. direct red 80, C. I. direct red 81, C.I. direct red 83, C. I. direct red 87, C. I. direct red 90, C. I. direct red 94, C. I. direct red 95, C. I. direct red 99, C. I. direct red 101, C. I. direct red 110, C. I. direct red 189, C.I. direct red 227, C. I. direct yellow 1, C. I. direct yellow 2, C. I. direct yellow 4, C. I. direct yellow 8, C. I. direct yellow 11, C. I. direct yellow 12, C. I. direct yellow 26, C. I. direct yellow 27, C. I. direct yellow 28, C. I. direct yellow 33, C. I. direct yellow 34, C. I. direct yellow 41, C. I. direct yellow 44, C. I. direct yellow 48, C. I. direct yellow 58, C. I. direct yellow 86, C. I. direct yellow 87, C. I. direct yellow 88, C. I. direct yellow 135, C. I. direct yellow 142, C. I. direct yellow 144, C. I. food black 1, C. I. food black 2, C. I. acid black 1, C. I. acid black 2, C. I. acid black 7, C. I. acid black 16, C. I. acid black 24, C. I. acid black 26, C. I. acid black 28, C. I. acid black 31, C. I. acid black 48, C. I. acid black 52, C. I. acid black 63, C. I. acid black 107, C. I. acid black 112, C. I. acid black 118, C. I. acid black 119, C. I. acid black 121, C. I. acid black 156, C. I. acid black 172, C. I. acid black 194, C. I. acid black 208, C. I. acid blue 1, C. I. acid blue 7, C.I. acid blue 9, C. I. acid blue 15, C. I. acid blue 22, C. I. acid blue 23, C. I. acid blue 27, C. I. acid blue 29, C. I. acid blue 40, C. I. acid blue 43, C. I. acid blue 55, C. I. acid blue 59, C. I. acid blue 62, C. I. acid blue 78, C. I. acid blue 80, C. I. acid blue 81, C. I. acid blue 83, C. I. acid blue 90, C. I. acid blue 102, C. I. acid blue 104, C. I. acid blue 111, C. I. acid blue 185, C. I. acid blue 249, C. I. acid blue 254, C. I. acid red 1, C. I. acid red 4, C. I. acid red 8, C. I. acid red 13, C. I. acid red 14, C. I. acid red 15, C. I. acid red 18, C. I. acid red 21, C. I. acid red 26, C. I. acid red 35, C. I. acid red 37, C. I. acid red 52, C. I. acid red 110, C. I. acid red 144, C. I. acid red 180, C. I. acid red 249, C. I. acid red 257, C. I. acid yellow 1, C. I. acid yellow 3, C. I. acid yellow 4, C. I. acid yellow 7, C. I. acid yellow 11, C. I. acid yellow 12, C. I. acid yellow 13, C. I. acid yellow 14, C. I. acid yellow 18, C. I. acid yellow 19, C. I. acid yellow 23, C. I. acid yellow 25, C. I. acid yellow 34, C. I. acid yellow 38, C. I. acid yellow 41, C. I. acid yellow 42, C. I. acid yellow 44, C. I. acid yellow 53, C. I. acid yellow 55, C. I. acid yellow 61, C. I. acid yellow 71, C. I. acid yellow 76, C. I. acid yellow 78, C. I. acid yellow 91 and C. I. acid yellow 122. If a dye containing a carboxyl group in the free or salt state as a functional group is used among water-soluble anionic dyes, the resulting mutual interaction with the carboxyl group in the free or salt state contained in the polymer provides more inhibition of unevenness in image. In particular, a dye comprising paired (counter) ions of carboxylate selected from the group consisting of alkaline metal and $NH_4^+$ is preferably used.

Examples of dyes desirable for minimization of unevenness in image include those having the following structural formulae (I) to (V):

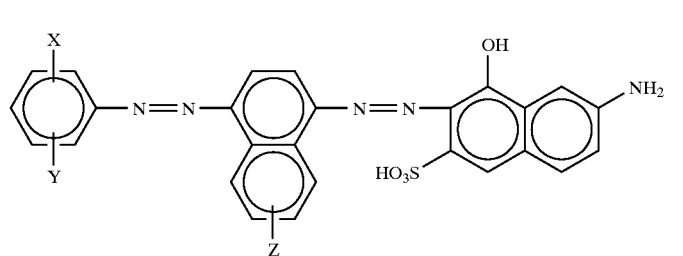

(I)

wherein X and Y each represent H or COOH; and Z represents H, COOH or $SO_3H$;

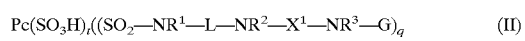

(II)

wherein Pc represents a metal-containing phthalocyanine nucleus; $R^1$, $R^2$ and $R^3$ each independently represent a hydrogen atom, alkyl group, substituted alkyl group, alkenyl group, substituted alkenyl group, aralkyl group or substituted aralkyl group; L represents a divalent organic connecting group; and $X^1$ represents a carbonyl group or a group represented by the following formula (1), (2) or (3):

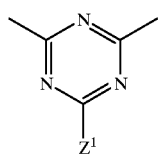
(1)

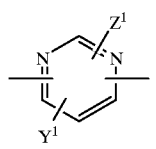
(2)

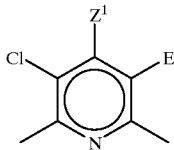
(3)

wherein E represents Cl or CN; $Z^1$ represents $NR^4R^5$, $SR^6$ or $OR^6$; $Y^1$ represents H, Cl, $SR^7$, $OR^7$ or group $Z^1$ (in which $R^4$, $R^5$, $R^6$ and $R^7$ each independently represent a hydrogen atom, alkyl group, substituted alkyl group, aryl group, substituted aryl group, aralkyl group or substituted aralkyl group, or $R^4$ and $R^5$ form a 5- or 6-membered ring together with the nitrogen atom bonded thereto); G represents a colorless organic group substituted by one or more groups selected from the group consisting of —COSH group and —COOH group; and t represents an integer of at least 1 and q represents an integer of at least 0, with the proviso that t and q make 3 or 4.

The dye represented by the foregoing formula (II) comprises at least one $SO_3H$ group and groups selected from the group consisting of —COSH group and —COOH group in the same amount as $SO_3H$ group by number.

$$Ar^1N=N-J-X^2-(NR^8-L-NR^9-X^2)_n-J-N=N-Ar^2 \quad (III)$$

wherein J represents the following group:

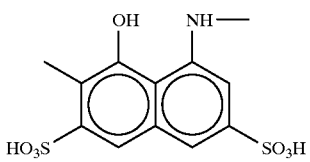

wherein $Ar^1$ and $Ar^2$ each independently represent an aryl group or substituted aryl group, with the proviso that at least one of $Ar^1$ and $Ar^2$ has at least one substituent selected from the group consisting of —COSH group and —COOH group; $R^8$ and $R^9$ each independently represent a hydrogen atom, alkyl group, substituted alkyl group, alkenyl group or substituted alkenyl group; L represents a divalent organic connecting group; n represents an integer of 0 or 1; and $X^2$ represents a carbonyl group or a group represented by the following formula (4), (5) or (6):

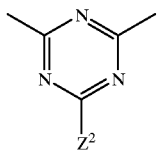
(4)

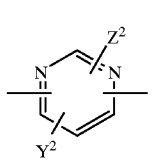
(5)

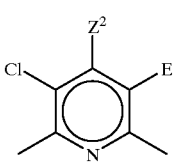
(6)

wherein E represents Cl or CN; $Z^2$ represents $NR^{10}R^{11}$, $SR^{12}$ or $OR^{12}$; $Y^2$ represents a hydrogen atom, Cl, $SR^{13}$, $OR^{13}$ or $Z^2$; and $Y^2$ represents a hydrogen atom, Cl, $SR^{13}$, $OR^{13}$ or group $Z^2$, with the proviso that $R^{10}$, $R^{11}$, $R^{12}$ and $R^{13}$ each independently represent a hydrogen atom, alkyl group, substituted alkyl group, alkenyl group, substituted alkenyl group, aralkyl group or substituted aralkyl group, or $R^{10}$ and $R^{11}$ form a 5- or 6-membered ring together with the nitrogen atom bonded thereto.

The dye represented by the foregoing formula (III) comprises groups selected from the group consisting of —COSH group and —COOH group in an amount of not less than $SO_3H$ group by number.

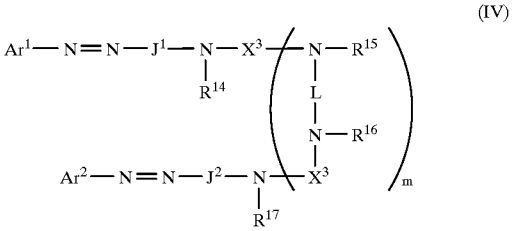
(IV)

wherein $Ar^1$ and $Ar^2$ each independently represent an aryl group or substituted aryl group, with the proviso that at least one of $Ar^1$ and $Ar^2$ contains at least one substituent selected from the group consisting of —COSH group and —COOH group; $J^1$ and $J^2$ each independently represent a group represented by the following formula (7), (8) or (9):

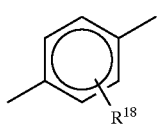
(7)

(8)

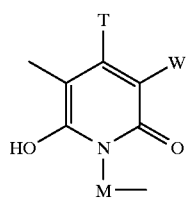

(9)

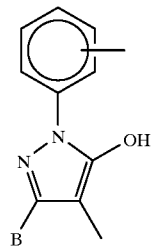

[wherein R[18] represents a group selected from the group consisting of hydrogen atom, alkyl group, substituted alkyl group, alkoxyhalogen, CN, ureide group and NHCOR[19] (in which R[19] represents a hydrogen atom, alkyl group, substituted alkyl group, aryl group, substituted aryl group, aralkyl group or substituted aralkyl group); T represents an alkyl group; W represents a hydrogen atom, CN, —CONR[20]R[21] (in which R[20] and R[21] each independently represent a group selected from the group consisting of hydrogen atom, alkyl group or substituted alkyl group), pyridinium group and —COOH; M represents a $C_{2-8}$ alkylene chain; and B represents a hydrogen atom, alkyl group or —COOH]; R[14], R[15], R[16] and R[17] each independently represent a hydrogen atom, alkyl group or substituted alkyl group; L represents a divalent organic connecting group; m represents 0 or 1; and X[3] represents a carbonyl group or a group represented by the following formula (10), (11) or (12):

(10)

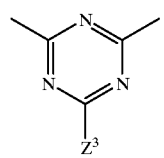

(11)

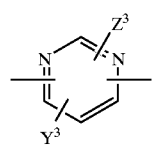

(12)

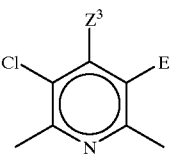

wherein $Z^3$ represents $OR^{22}$, $SR^{22}$ or $NR^{23}R^{24}$ (in which $R^{22}$, $R^{23}$ and $R^{24}$ each independently represent a hydrogen atom, alkyl group, substituted alkyl group, alkenyl group, substituted alkenyl group, aryl group, substituted aryl group, aralkyl group or substituted aralkyl group or $R^{23}$ and $R^{24}$ form a 5- or 6-membered ring together with the nitrogen atom bonded thereto); $Y^3$ represents a hydrogen atom, Cl or CN; and E represents Cl or CN.

The dye represented by the foregoing formula (IV) contains at least two substituents selected from the group consisting of —COSH group and —COOH group if it is free of SO₃H group or contains groups selected from the group consisting of —COSH group and —COOH group in an amount of not less than SO₃H group by number if it contains SO₃H group.

(V)

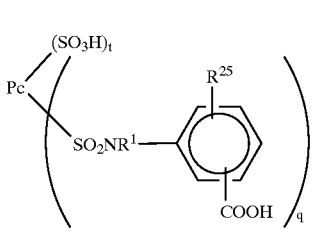

wherein Pc represents a metal-containing phthalocyanine nucleus; $R^1$ represents a hydrogen atom, alkyl group, substituted alkyl group, alkenyl group, substituted alkenyl group, aralkyl group or substituted aralkyl group; $R^{25}$ represents a hydrogen atom, alkyl group, alkoxy group, halogen atom, amino group or substituted amino group; and t represents an integer of at least 1 and q represents an integer of at least 0, with the proviso that t and q make 3 or 4.

Specific examples of these dyes will be given below.

Compound (1)

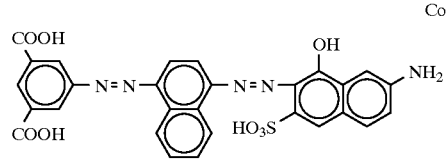

Compound (2)

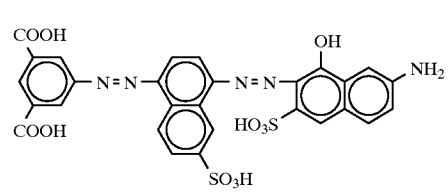

-continued
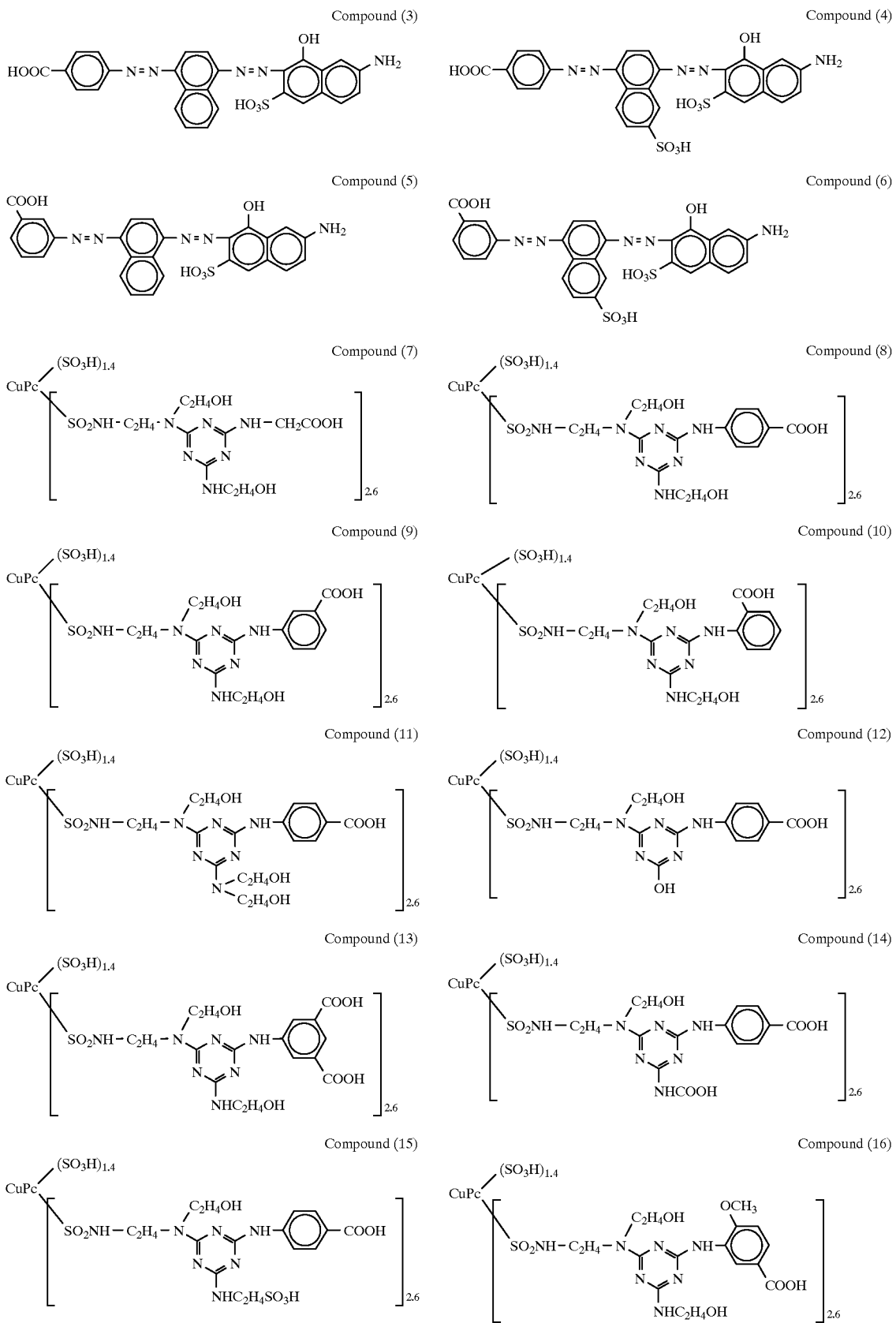

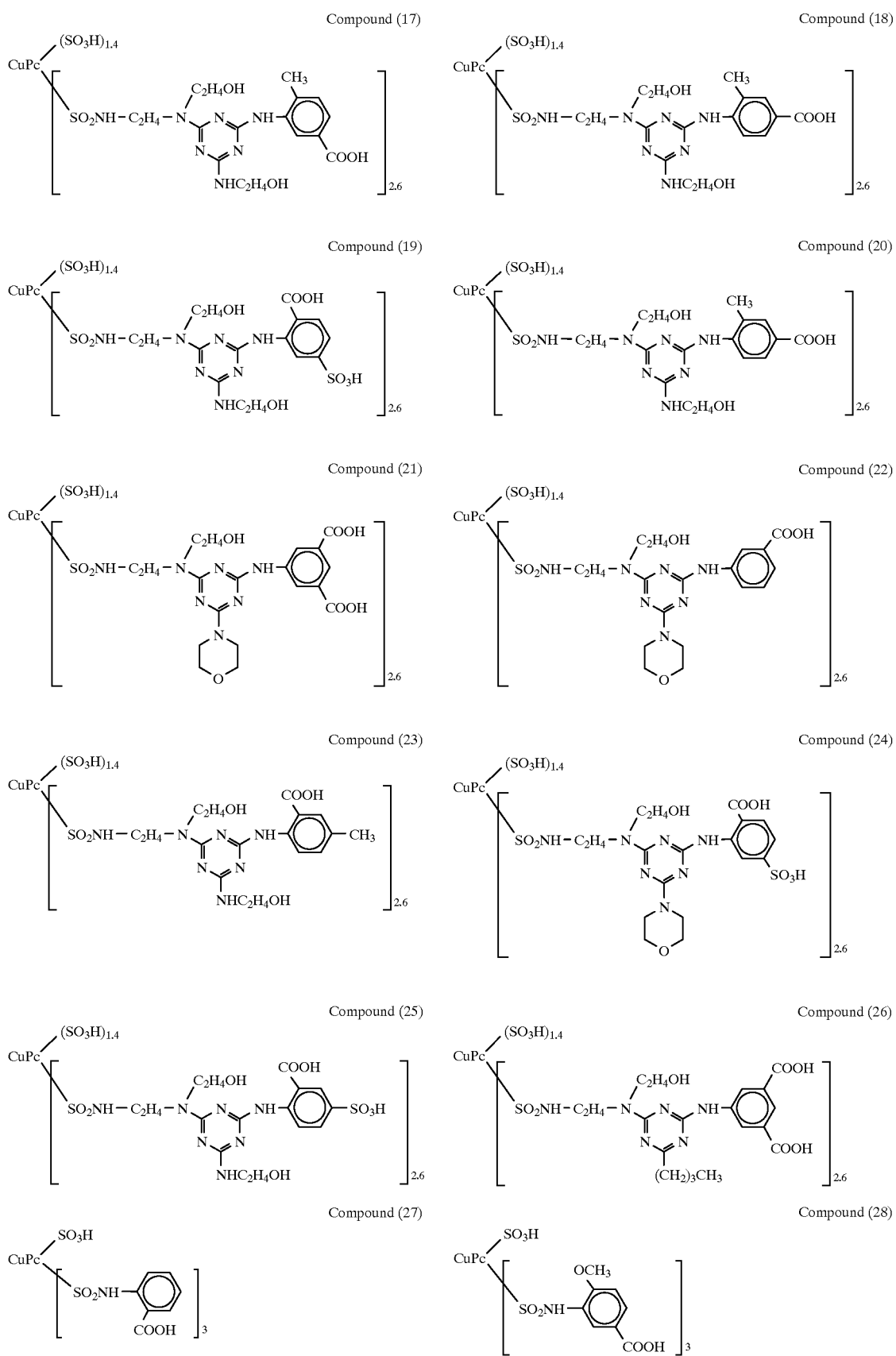

-continued
Compound (29)
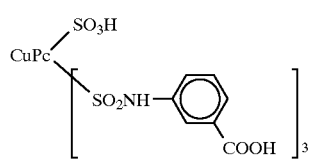
Compound (30)
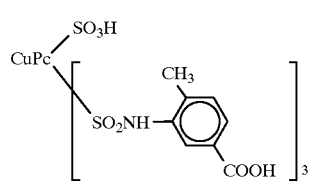
Compound (31)
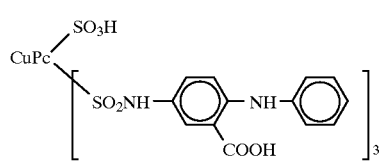
Compound (32)
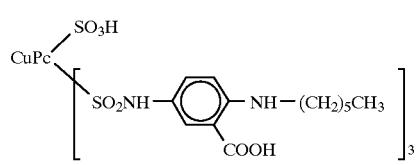
Compound (33)
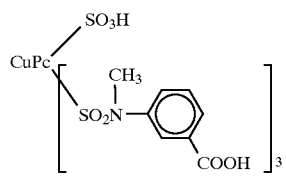
Compound (34)
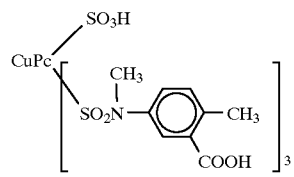
Compound (35)
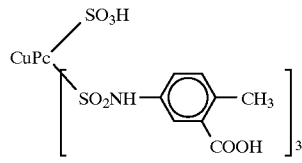
Compound (36)
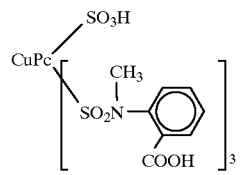
Compound (37)
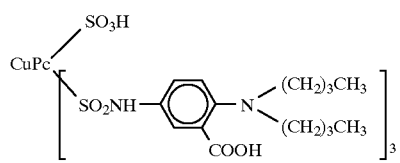
Compound (38)
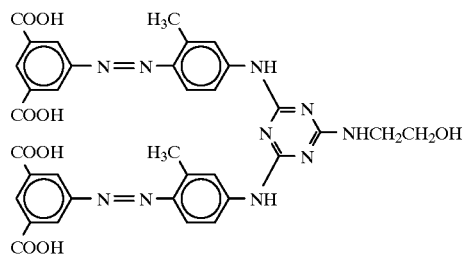
Compound (39)
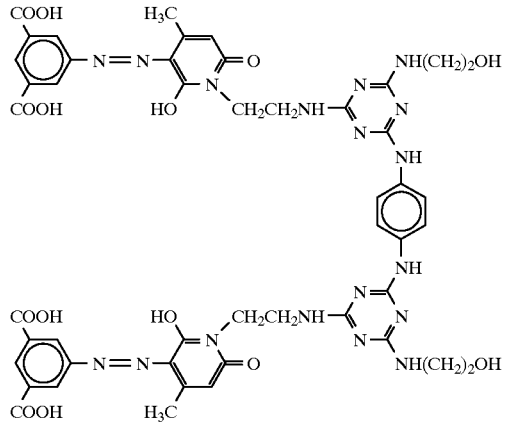
Compound (40)
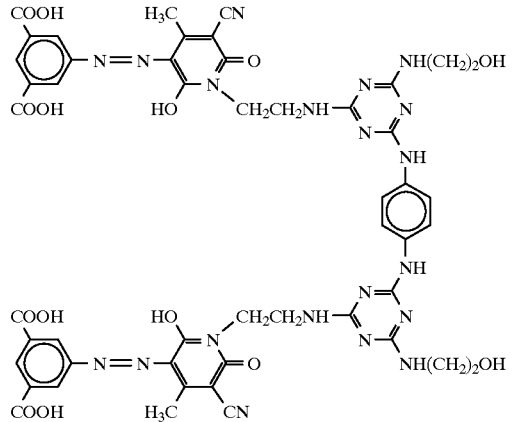

-continued
Compound (41)
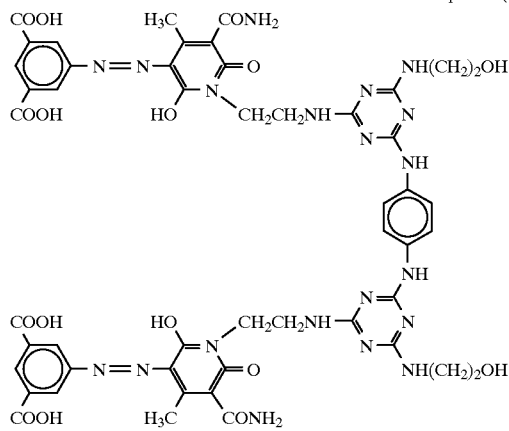
Compound (42)
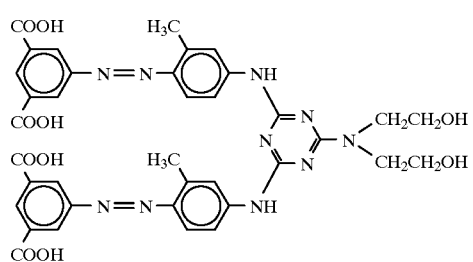
Compound (43)
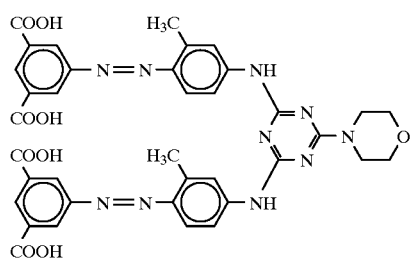
Compound (44)
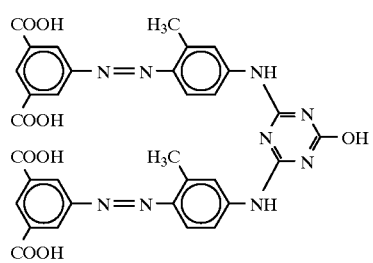
Compound (45)
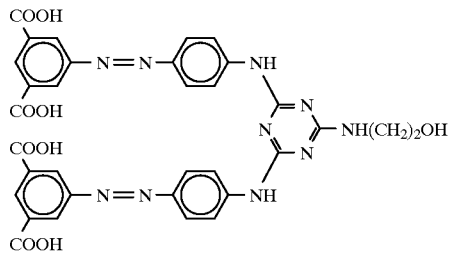
Compound (46)
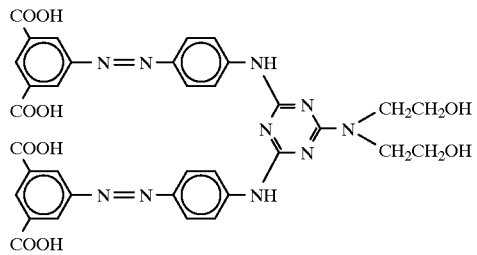
Compound (47)
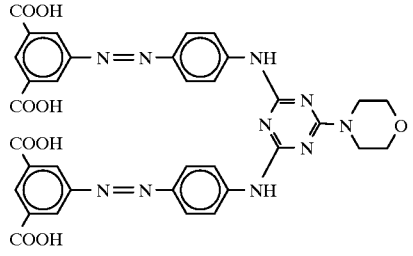
Compound (48)
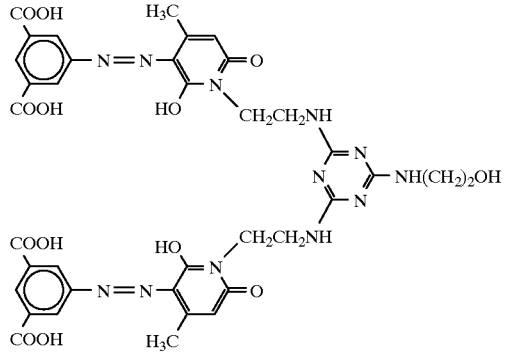
Compound (49)
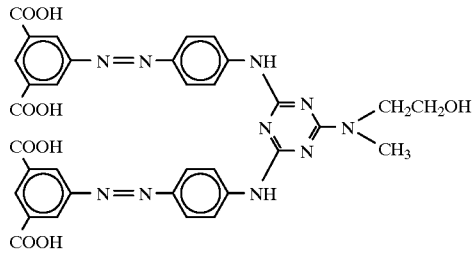
Compound (50)
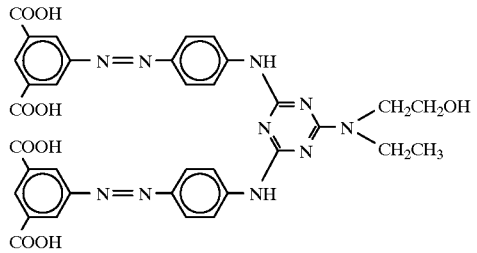

-continued
Compound (51)
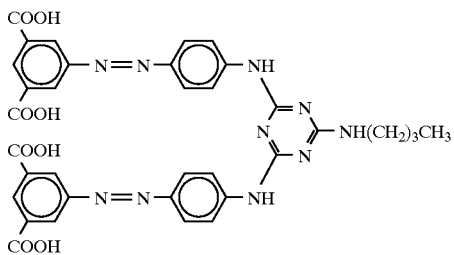
Compound (52)
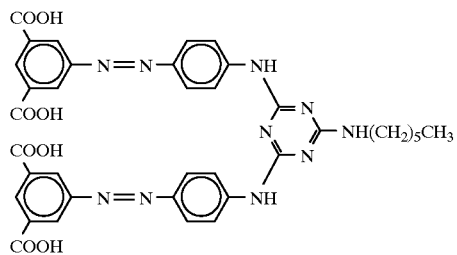
Compound (53)
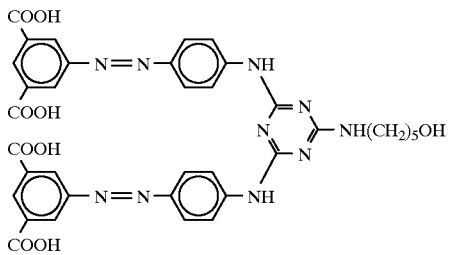
Compound (54)
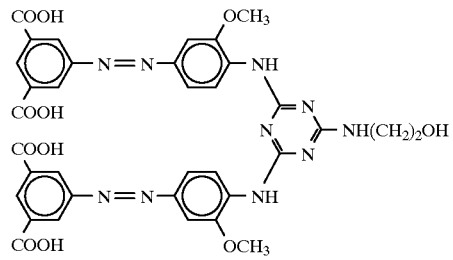
Compound (55)
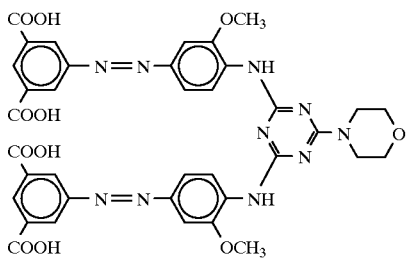
Compound (56)
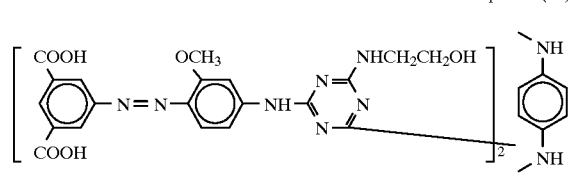
Compound (57)
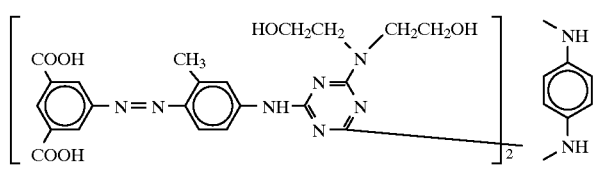
Compound (58)
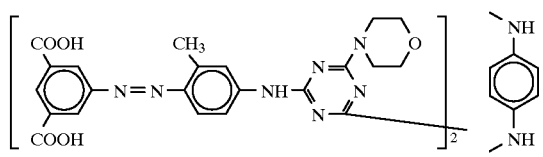
Compound (59)
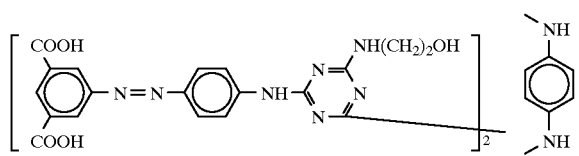
Compound (60)
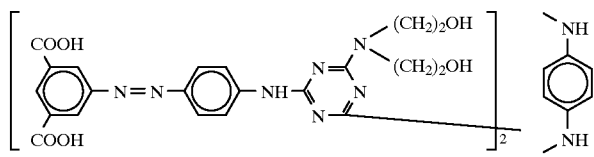

-continued
Compound (61)
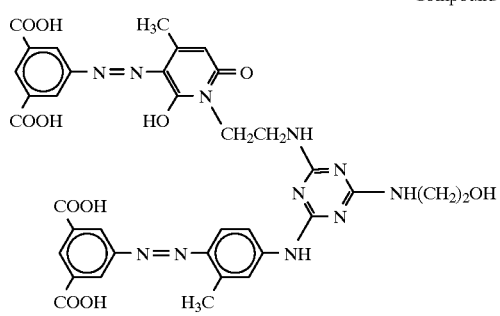
Compound (62)
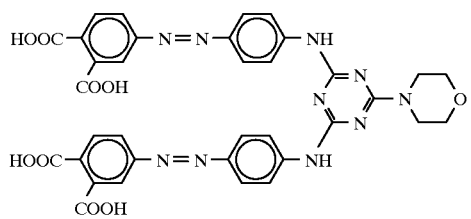
Compound (63)
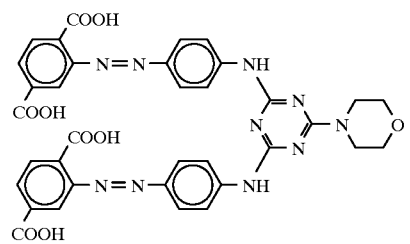
Compound (64)
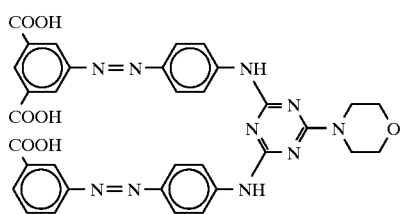
Compound (65)
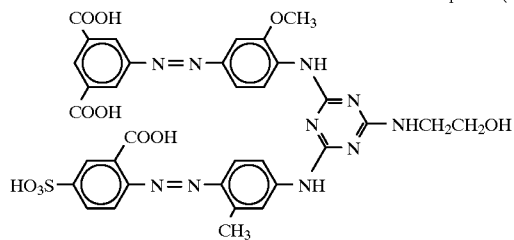
Compound (66)
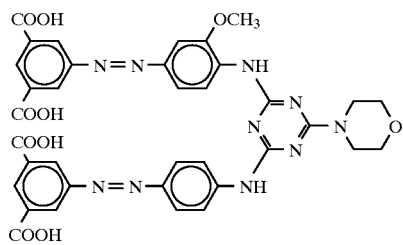
Compound (67)
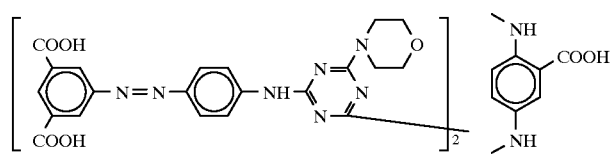
Compound (68)
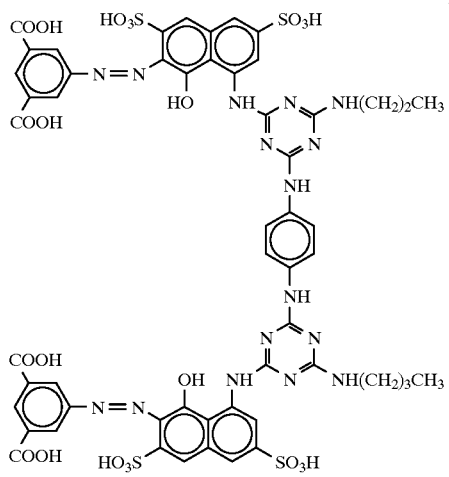
Compound (69)
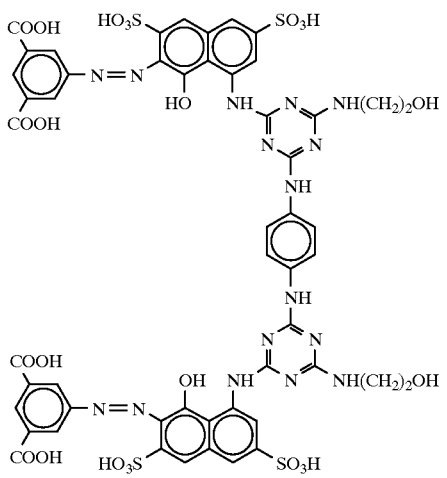

-continued
Compound (70)
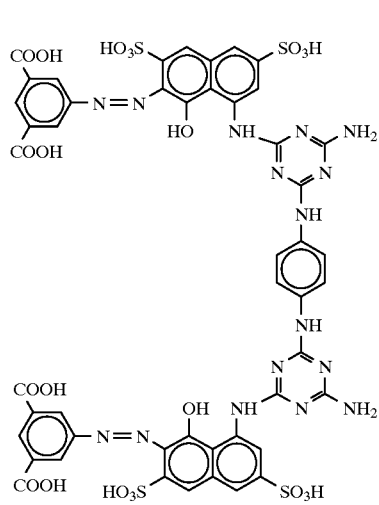
Compound (71)
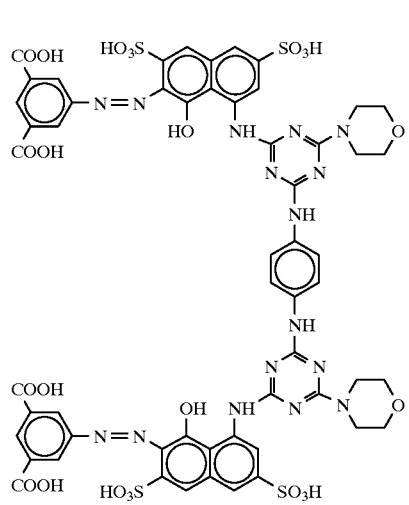
Compound (72)
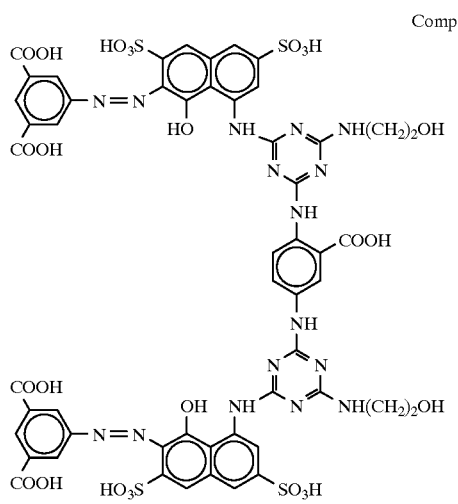
Compound (73)
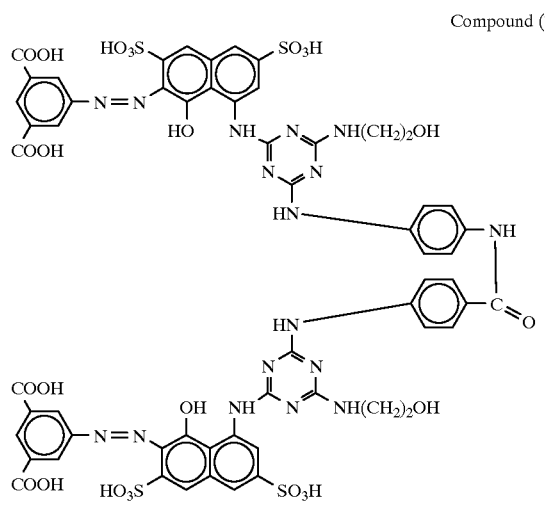
Compound (74)
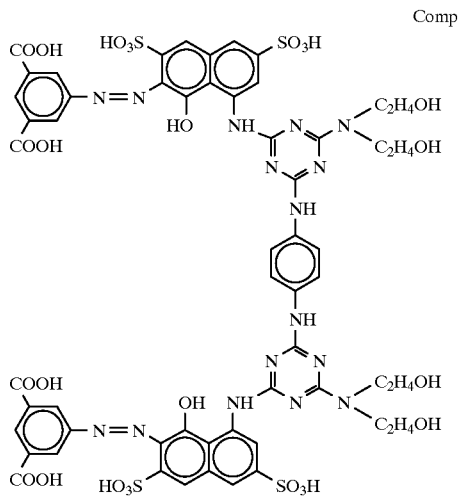
Compound (75)
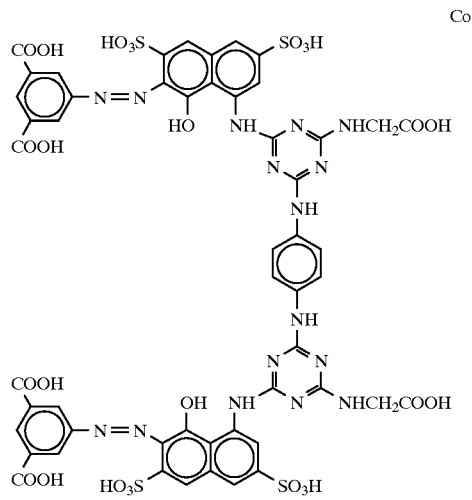

-continued
Compound (76)
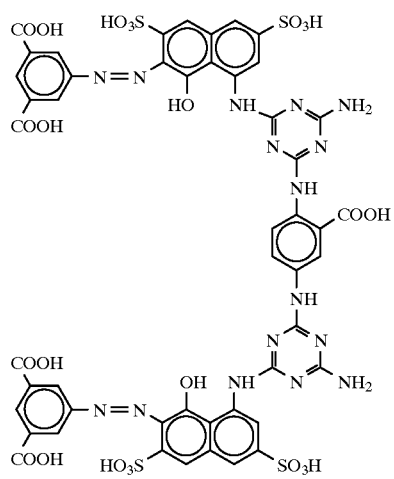
Compound (77)
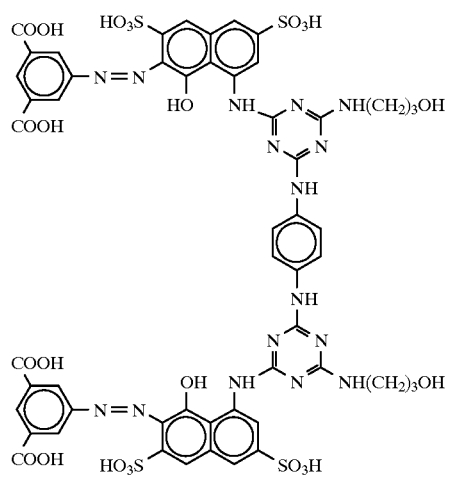
Compound (78)
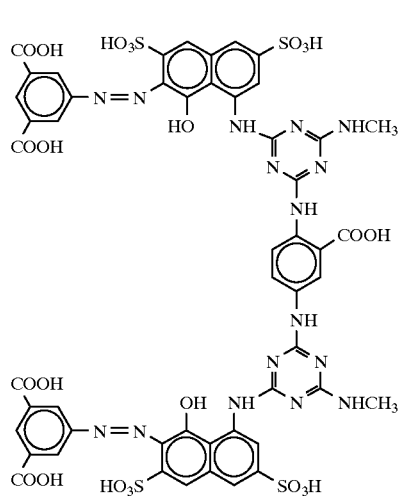
Compound (79)
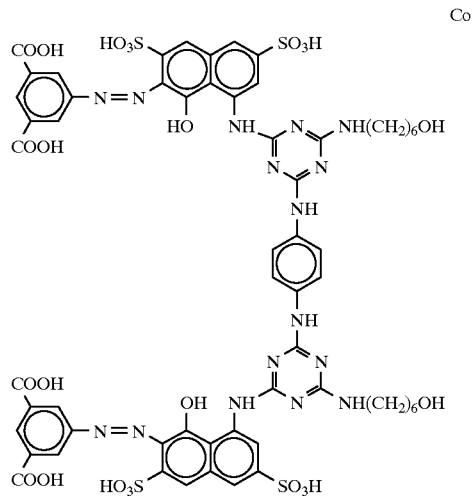
Compound (80)
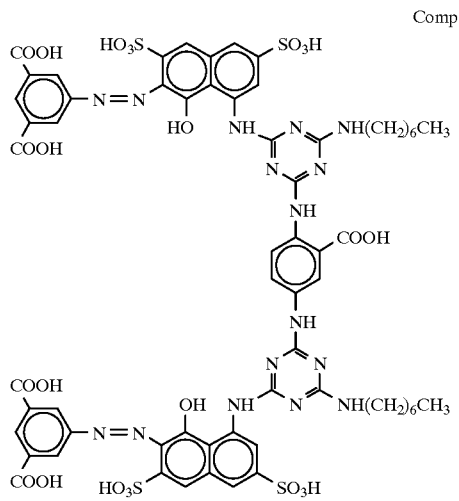
Compound (81)
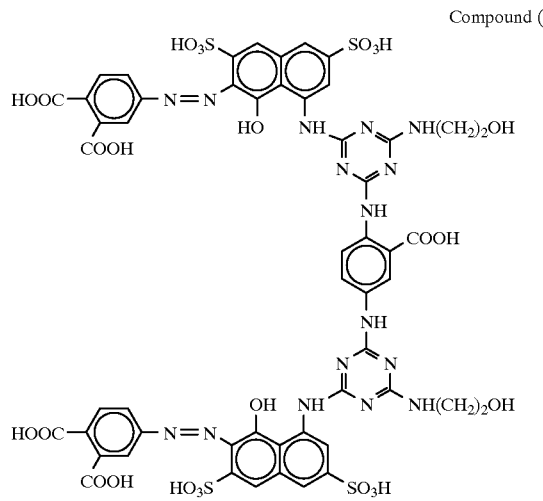

-continued

Compound (82)

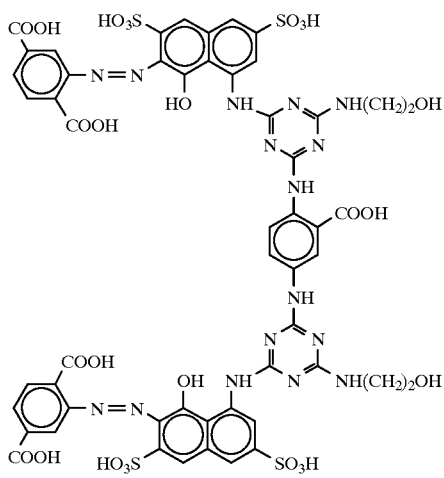

The content of these dyes is preferably predetermined to a range of from 0.1 to 20% by weight, more preferably from 1 to 10% by weight, even more preferably from 1 to 5% by weight, based on the total amount of the ink composition. If the content of these dyes exceeds the above defined range, the resulting ink composition can clog the nozzle more easily when water evaporates at the tip of the nozzle. On the contrary, if the content of these dyes falls below the above defined range, the resulting ink composition cannot be, of course, provided with a sufficient density. Thus, the above defined range is desirable. These dyes may be used singly or in combination of two or more of them. The ink may be toned to four primaries, i.e., cyan, magenta, yellow and black, as well as to custom colors such as red, blue and green.

In the present invention, as the coloring material there may be used a pigment as well. Examples of the pigment include carbon black, phthalocyanine blue, permanent red, brilliant fast scarlet, quinacridone red, disazo yellow, lake red, naphthol yellow, peacock blue lake, fast yellow, lake carmine, magnetic material such as magnetite and ferrite, titanium black, colorless extender pigment, white pigment, metalescent pigment such as gold and silver, and silica. These pigments may be dispersed in the ink composition with a dispersant to prepare a pigment-dispersed ink. Specific examples of these pigments include Raven 5250, Raven 3500, Raven 5750, Regal 330R, Mogul L, Monoarch 1000, Color Black FW2, Printex V, Mitsubishi No. 25, C. I. Pigment Black 26, C. I. Pigment Black 28, C. I. Pigment Black 36, C. I. Pigment Blue 1, C. I. Pigment Blue 2, C. I. Pigment Blue 3, C. I. Pigment Blue 15, C. I. Pigment Blue 15 : 1, C. I. Pigment Blue 15 : 3, C. I. Pigment Blue 15 : 34, C. I. Pigment Blue 16, C. I. Pigment Blue 22, C. I. Pigment Blue 27, C. I. Pigment Blue 28, C. I. Pigment Blue 36, C. I. Pigment Blue 60, C. I. Pigment Red 3, C. I. Pigment Red 5, C. I. Pigment Red 7, C. I. Pigment Red 12, C. I. Pigment Red 48, C. I. Pigment Red 48 : 1, C. I. Pigment Red 49, C. I. Pigment Red 53, C. I. Pigment Red 57, C. I. Pigment Red 58, C. I. Pigment Red 64, C. I. Pigment Red 81, C. I. Pigment Red 104, C. I. Pigment Red 108, C. I. Pigment Red 112, C. I. Pigment Red 122, C. I. Pigment Red 123, C. I. Pigment Red 146, C. I. Pigment Red 168, C. I. Pigment Red 170, C. I. Pigment Red 184, C. I. Pigment Red 202, C. I. Pigment Red 257, C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 34, C. I. Pigment Yellow 35, C. I. Pigment Yellow 37, C. I. Pigment Yellow 55, C. I. Pigment Yellow 74, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 128, C. I. Pigment Yellow 129, C. I. Pigment Yellow 151, C. I. Pigment Yellow 154, C. I. Pigment Yellow 157, C. I. Pigment Yellow 167, and C. I. Pigment Yellow 193. These pigments may be subjected to surface treatment with an alcohol, acid, base, coupling agent, polymer, surface active agent, plasma, etc. as necessary. As the coloring materials there may be used the foregoing pigments and the foregoing dyes in admixture.

In the ink for ink jet recording of the present invention, the water-soluble organic solvent acts to inhibit the evaporation of water. Specific examples of the water-soluble organic solvent include polyvalent alcohols such as ethylene glycol, diethylene glycol, propylene glycol, polyethylene glycol, triethylene glycol, glycerin, trimethylol propane, 1,2,6-hexanetriol, 1,5-pentanediol and dipropylene glycol, lower glycol ethers such as ethylene glycol monomethyl ether, ethylene glycol monoethyl ether, diethylene glycol monomethyl ether and propylene glycol monomethyl ether, sulfur-containing solvents such as thiodiethanol, 2-mercaptoethanol, thioglycerol, sulfolane and dimethyl sulfoxide, and nitrogen-containing solvents such as 2-pyrrolidone, N-methyl-2-pyrrolidone, cyclohexylpyrrolidone, triethanolamine and diethanolamine. These solvents may be used singly or in combination of two or more of them. If the content of these water-soluble organic solvents is too high, the resulting ink composition exhibits an increased viscosity that makes it to be jetted less stably and in a reduced response to recording signal. Thus, the content of these water-soluble organic solvents is preferably predetermined to a range of about from 1 to 60% by weight, more preferably about from 5 to 40% by weight, based on the weight of the ink composition.

The ink for ink jet recording of the present invention may comprise a surface active agent incorporated therein. As such a surface active agent there may be used a nonionic or anionic surface active agent. Specific examples of such a nonionic surface active agent include polyoxyethylene alkylphenyl ether, polyoxyethylene alkyl ether, polyoxyethylenealiphatic acid ester, sorbitanaliphatic acid ester, polyoxyethylenesorbitanaliphatic acid ester, polyoxyethyleneglycerinalphatic acid ester, polyoxyethylene sterol, polyoxyethylene polyoxypropylene ether, polyoxyethylenealiphatic acid amide, polyoxyethylene polyoxypropylene block copolymer, tetramethyldecinediol, and tetramethyldecinediol-ethylene oxide adduct. Specific examples of the anionic surface active agent include alkylbenzenesulfonate, alkylphenylsulfonate, alkylnaphthalenesulfonate, higher aliphatic acid salt, sulfate of higher aliphatic acid ester, sulfonate of higher aliphatic acid ester, sulfate of higher alcohol ether, sulfonate of higher alcohol ether, higher alkylsulfosuccinate, formalin condensate of naphthalene sulfonate, polystyrenesulfonate, polyacrylic acid salt, phosphate of polyoxyethylene alkyl ether, carboxylate of alkylether, alkyl sulfate, and acrylic acid-acrylic acid ester copolymer.

Other examples of the surface active agent employable herein include silicone surface active agent such as polysiloxane-polyoxyethylene adduct, fluorine surface active agent such as perfluoroalkylcarboxylate, perfluoroalkyl sulfonate and oxyethylene perfluoroalkylether, and biosurfactant such as spiculisporic acid, rhamnolipide and lysolecithin.

The surface active agent to be used herein acts to further stabilize the dissolution or dispersion of the dye or pigment as well as facilitate the penetration of the ink into paper and expedite drying as exerted when incorporated in ordinary ink for ink jet recording. At the same time, the surface active agent contributes to the enhancement of the cleanability of the ink jet head by wiper. These surface active agents may be used singly or in admixture. The content of these surface active agents is preferably predetermined to a range of from 0.001 to 5% by weight, more preferably from 0.01 to 3% by weight. If the content of these surface active agents falls below 0.001% by weight, the desired effect cannot be exerted. On the contrary, if the content of these surface active agents exceeds 5% by weight, the resulting ink composition penetrates into paper so far as to cause bleeding. Preferred among the foregoing surface active agents are nonionic surface active agents taking into account the image uniformity, dryability, resistance to foaming, resistance to clogging, etc.

The ink for ink jet recording of the present invention needs to have a pH value of not lower than 7.5 to have the foregoing polymer dissolved therein. The pH value of the ink for ink jet recording of the present invention is preferably from not less than 8 to not more than 10 taking into account the corrosion of recording head or cartridge member, particularly the dissolution stability of a water-soluble anionic dye containing a carboxylic acid or carboxylate, if any.

As a pH adjustor there may be used an acid such as hydrochloric acid, sulfuric acid, nitric acid, acetic acid, citric acid, oxalic acid, malonic acid, boric acid, phosphoric acid, phosphorous acid and lactic acid, base such as sodium hydroxide, potassium hydroxide, lithium hydroxide and ammonia, phosphate, oxalate, amine salt or buffer such as Goods buffer.

The ink for ink jet recording of the present invention may further comprise a polyethyleneimine, polyamine, polyvinylpyrrolidone, polyethylene glycol, cellulose derivative or the like incorporated therein as a physical property adjustor. The ink for ink jet recording of the present invention may also comprise a cyclodextrin, polycyclodextrin, macrocyclic amine, crown ether or the like incorporated therein as a clathrate compound. The ink for ink jet recording of the present invention may comprise a mildewproofing agent, corrosion inhibitor, germicide, oxidation inhibitor, chelating agent, dendrimer or the like incorporated therein as necessary.

The ink for ink jet recording of the present invention needs to have a surface tension of from 20 to 40 mN/m, preferably from 25 to 38 mN/m to minimize the drying time and maintain the jetting stability taking into account the wetting properties with respect to the material on which recording is effected and the head nozzle member. If the surface tension of the ink composition falls below 20 mN/m, the resulting ink tends to flows over the nozzle. On the contrary, if the surface tension of the ink composition exceeds 40 mN/m, it takes a prolonged period of time for the ink to dry.

If the stationary flow viscosity of the ink for ink jet recording of the present invention is too low, the ink can drop from the nozzle. On the contrary, if the stationary flow viscosity of the ink for ink jet recording of the present invention is too high, the resistance of the ink to jetting force is too great. Thus, the stationary flow viscosity of the ink for ink jet recording of the present invention is preferably from 1.5 to 5.0 mpas.

By using the foregoing components (1) to (3) in combination, the ink for ink jet recording of the present invention can exert a raised effect of improving image quality particularly when the drying time on ordinary paper is not more than 5 seconds. The term "drying time" as used herein is meant to indicate the time required until the printed image is no longer transferred to paper which is superposed thereon.

The ink for ink jet recording of the present invention is used in an ink jet recording method which comprises jetting an ink droplet through an orifice in response to a recording signal to effect recording. In some detail, the ink for ink jet recording of the present invention is preferably used in a high resolution small drop print ink jet recording method in which the output of ink per droplet is from 1 ng to 70 ng. In this case, the specific surface area of the droplet is greater than when outputted in a larger amount. Thus, the compound represented by the foregoing formula (A) and the foregoing polymer strongly interact with each other particularly in the vicinity of the surface of the droplet. Therefore, it is presumed that the effect of improving image quality can be exerted more strongly. In particular, the ink for ink jet recording of the present invention is preferably used at an output of from 1 to 30 ng per droplet.

Further, in the case where a recording system of acting heat energy to jet ink is employed, the ink for ink jet recording of the present invention can penetrate into the recording material vertically more rapidly and horizontally less rapidly and provide an improved image quality and dry more rapidly because the water-soluble organic compound which normally stays solid but vaporizes in a proportion of not less than 50% by weight at a temperature of from 100° C. to 350° C. expedites the jetting of the ink. Further, since the ink for ink jet recording of the present invention can be jetted at a raised force, an improved effect of inhibiting clogging can be exerted. By applying a plurality of pulses to form a droplet which is then jetted, i.e., applying a driving signal call prepulse prior to main driving signal to form a droplet which is then jetted, the amount of the ink to be jetted can be stabilized, exerting a predetermined effect of improving image quality. At the same time, an effect of enhancing the stability during continuous jetting can be exerted.

As mentioned above, the ink for ink jet recording of the present invention comprising as essential ingredients water, a coloring material and a water-soluble organic solvent, characterized in that said ink comprises a polymer containing a carboxyl group having an average molecular weight of from 1,000 to 20,000 in the free or salt state in an amount of from 0.1 to 3% by weight, a water-soluble organic compound which normally stays solid but vaporizes in a proportion of not less than 50% by weight at a temperature of from 100° C. to 350° C. in an amount of from 1 to 20% by weight, and a compound represented by the foregoing formula (A) in an amount of from 1 to 20% by weight and exhibits a surface tension of from 20 to 40 mN/m and a pH value of not less than 7.5, can be jetted stably and dry rapidly on the recording material, causes no bleeding and provides a high density uniform image.

The improvement mechanism by the addition of the foregoing components (1) to (3) is not yet made clear. It is presumed that a raised effect of thickening at the surface of droplet exerted by the interaction of the carboxyl group in the free or salt state in the polymer with the oxyethylene or oxypropylene group in the compound (A) and the addition of the water-soluble organic compound which normally stays solid but vaporizes in a proportion of not less than 50% by weight at a temperature of from 100° C. to 350° C. allow the resulting ink to wet the recording material more uniformly, making it possible to not only inhibit bleeding but also minimize image unevenness. In particular, in the case of small drop printing process in which the ink is outputted at a rate of 1 ng to 70 ng per droplet, the less the output is, the more is the ratio of the surface area of the ink droplet to the volume thereof. Therefore, the effect of thickening at the surface of droplet becomes more remarkable towards the effect of inhibiting bleeding. In the case where an ink jet recording method which comprising the action of heat energy to jet ink is employed, the water-soluble organic compound which normally stays solid but vaporizes in a proportion of not less than 50% by weight at a temperature of from 100° C. to 350° C. vaporizes in the vicinity of the heater to enhance the jetting force, making it possible to minimize the drying time and further improve image quality. Further, if the ink composition comprises a dye containing a carboxyl group in the free or salt state, the interaction of the carboxyl group with the carboxyl group in the free or salt state in the polymer and the force of hydrogen bond of the carboxyl group to cellulose hydroxyl group in paper facilitate the fixing of the dye, making it possible to inhibit bleeding.

The present invention will be further described in the following examples and comparative examples.

EXAMPLE 1

| | |
|---|---|
| Ammonium salt of Compound (40) | 2 parts by weight |
| Urea (vaporization weight: 70%) | 5 parts by weight |
| Styrene-sodium methacrylate copolymer (average molecular weight: 7,000; styrene:methacrylic acid = 1:1) | 1 part by weight |
| Butyl carbitol | 5 parts by weight |
| Thiodiethanol | 15 parts by weight |
| Pure water | 72 parts by weight |

The foregoing various components were thoroughly mixed to make a solution which was then filtered through a filter having a pore diameter of 0.45 μm under pressure to prepare an ink.

EXAMPLE 2

| | |
|---|---|
| Ammonium salt of Compound (40) | 2 parts by weight |
| Urea (vaporization weight: 70%) | 7 parts by weight |
| Styrene-lithium acrylate copolymer (average molecular weight: 5,000; styrene:acrylic acid = 1:2) | 0.5 part by weight |
| Butyl carbitol | 5 parts by weight |
| Oxyethylene oleyl ether | 0.05 part by weight |
| Glycerin | 10 parts by weight |
| Pure water | 80 parts by weight |

The foregoing various components were thoroughly mixed to make a solution which was then filtered through a filter having a pore diameter of 0.45 μm under pressure to prepare an ink.

COMPARATIVE EXAMPLE 1

| | |
|---|---|
| Ammonium salt of Compound (40) | 2 parts by weight |
| Glycerin | 15 parts by weight |
| Pure water | 83 parts by weight |

The foregoing various components were thoroughly mixed to make a solution which was then filtered through a filter having a pore diameter of 0.45 μm under pressure to prepare an ink.

COMPARATIVE EXAMPLE 2

| | |
|---|---|
| Ammonium salt of Compound (40) | 2 parts by weight |
| Urea (vaporization weight: 70%) | 7 parts by weight |
| Thiodiethanol | 15 parts by weight |
| Pure water | 80 parts by weight |

The foregoing various components were thoroughly mixed to make a solution which was then filtered through a filter having a pore diameter of 0.45 μm under pressure to prepare an ink.

COMPARATIVE EXAMPLE 3

| | |
|---|---|
| Ammonium salt of Compound (40) | 2 parts by weight |
| Styrene-ammmonium acrylate copolymer (average molecular weight: 30,000; styrene:acrylic acid = 1:3) | 1 part by weight |
| Thiodiethanol | 15 parts by weight |
| Pure water | 80 parts by weight |

The foregoing various components were thoroughly mixed to make a solution which was then filtered through a filter having a pore diameter of 0.45 μm under pressure to prepare an ink.

COMPARATIVE EXAMPLE 4

| | |
|---|---|
| Ammonium salt of compound (40) | 2 parts by weight |
| Styrene-lithium acrylate copolymer (average molecular weight: 15,000; styrene:acrylic acid = 1:2) | 1 part by weight |
| Propylene glycol monomethylether | 15 parts by weight |
| Thiourea (vaporization weight: 75%) | 4 parts by weight |
| Pure water | 80 parts by weight |

The foregoing various components were thoroughly mixed to make a solution which was then filtered through a filter having a pore diameter of 0.45 μm under pressure to prepare an ink.

Evaluation of Ink (1) Ink surface tension

The ink surface tension was measured by means of a Wilhelmy's surface tensiometer in an atmosphere of 23° C. and 55% RH.

(2) Ink viscosity

The ink viscosity was measured at a shear rate of 1,400 $s^{-1}$ in an atmosphere of 23° C. and 55% RH.

(3) Ink pH

The ink pH was measured by means of a glass pH electrode in an atmosphere of 23° C. and 55%RH.

(4) Ink drop

The ink was jetted through a head made on an experimental basis in such a manner that ¼ tone (2035×128 pulses) was given three times at a frequency of 6 KHz in an amount of 23° C. and 55% RH. The ink thus jetted was received by a small piece of ink absorbent on which it was then measured for weight. The discharge per drop (ink drop) was then calculated.

(5) Image quality test

The ink prepared was subjected to typing test (solid image, with 1 dot line and 100% coverage) on two kinds (high size, low size) of FX-L paper (available from Fuji Xerox Co., Ltd.) as a representative ordinary paper using a thermal ink jet printer having a resolution of 600 dpi made on an experimental basis for evaluation. The properties to be evaluated were line bleeding, line thickening, solid image density, and color unevenness of solid image.

a) Line bleeding

G: No bleeding; F: Slight bleeding; P: Whisker-like bleeding on many areas b) Line thickening G: Less than 70 µm; F: 70—less than 100 µm; P: Not less than 100 µm c) Solid image density G: Within the desired range; P: Target not accomplished d) Unevenness of solid color G: No unevenness; F: Slight unevenness; P: Remarkable unevenness, little unevenness (6) Anti-clogging property test The ink prepared was jetted using a thermal ink jet printer having a resolution of 600 dpi made on an experimental basis for evaluation. Jetting was then suspended. The printer was then allowed to stand at a temperature of 23° C. and 55% RH with the nozzle uncapped. Jetting was then resumed. The minimum length of suspension after which image disturbance occurs was determined. The criteria of evaluation was as follows:

G: Not less than 1 min.; F: 0.5—less than 1 min.; P: Less than 0.5 min.

(7) Dryability test

A 5 mm×25 mm solid image was printed on FX-L paper (available from Fuji Xerox Co., Ltd.) as an ordinary paper using a thermal ink jet printer having a resolution of 600 dpi made on an experimental basis for evaluation in an atmosphere of 23° C. and 55% RH. A coat paper for ink jet was then laminated on the printed paper under a load of 100 g. The time required until the ink was no longer transferred to the coat paper was then determined. The evaluation was made according to the following criteria:

G: Less than 5 seconds; F: 5—less than 10 seconds; P: Not less than 10 seconds

TABLE 1

|  | Example 1 | Example 2 | Comparative Example 1 | Comparative Example 2 | Comparative Example 3 | Comparative Example 4 |
| --- | --- | --- | --- | --- | --- | --- |
| Ink surface tension (mN/m) | 34 | 33 | 55 | 48 | 45 | 43 |
| Ink viscosity (mPas) | 2.4 | 2.0 | 1.4 | 1.6 | 1.8 | 2.3 |
| Ink pH | 9.1 | 8.7 | 6.7 | 6.8 | 8.9 | 8.7 |
| Ink drop (ng) | 24 | 27 | 28 | 27 | 25 | 23 |
| Image quaiity test a) | G(G) | G(G) | P(F) | P(F) | F(G) | P(F) |
| Image quality test b) | G(G) | G(G) | F(G) | P(F) | F(G) | F(G) |
| Image quality test c) | G(G) | G(G) | G(G) | G(G) | G(G) | P(F) |
| Image quality test d) | G(G) | G(G) | F(P) | P(P) | F(P) | F(P) |
| Anti-clogging property test | G | G | F | G | P | G |
| Dryability test | G | G | P | P | P | P |

The symbol in parenthesis indicates evaluation on high size paper.

EXAMPLE 3

| Sodium salt of Compound (2) | 3 parts by weight |
| --- | --- |
| Diethylene glycol | 20 parts by weight |
| Styrene-potassium methacrylate copolymer (average molecular weight: 4,200; styrene:methacrylic acid = 1:2) | 2 parts by weight |
| Urea (vaporization weight: 70%) | 3 parts by weight |
| Propylene glycol monobutyl ether | 7 parts by weight |
| Pure water | 65 parts by weight |

The foregoing various components were thoroughly mixed to make a solution which was then filtered through a filter having a pore diameter of 0.45 µm under pressure to prepare an ink. The ink thus prepared exhibited a viscosity of 3.5 mpas, a surface tension of 33 mN/m and a pH value of 8.6. The ink output per droplet (hereinafter referred to as "ink drop") was 19 ng. The results of image quality test, anti-clogging test and dryability test were all good according to the foregoing evaluation criteria.

EXAMPLE 4

| Lithium salt of Compound (28) | 3 parts by weight |
| --- | --- |
| Glycerin | 15 parts by weight |

-continued

| | |
|---|---|
| Styrene-sodium maleate copolymer (average molecular weight: 1,900; styrene:maleic acid = 3:1) | 1.5 parts by weight |
| Butyl carbitol | 2 parts by weight |
| N-methylurea (vaporization weight: 85%) | 5 parts by weight |
| Pluronic 6400 (oxyethylene oxypropylene block copolymer), available from BASF | 1.5 parts by weight |
| Pure water | 72 parts by weight |

The foregoing various components were thoroughly mixed to make a solution which was then filtered through a filter having a pore diameter of 0.45 μm under pressure to prepare an ink. The ink thus prepared exhibited a viscosity of 2.8 mPas, a surface tension of 35 mN/m and a pH value of 8.7. The ink drop was 23 ng. The results of image quality test, anti-clogging test and dryability test were all good according to the foregoing evaluation criteria.

EXAMPLE 5

| | |
|---|---|
| X-38 black dye, available from BASF | 3 parts by weight |
| Ethylene glycol | 10 parts by weight |
| Styrene-lithium maleic anhydride copolymer (average molecular weight: 3,000; styrene:maleic acid = 1:1) | 0.8 parts by weight |
| N,N'-Dimethylurea (vaporization weight: 99%) | 10 parts by weight |
| Hexylcarbitol | 3 parts by weight |
| Pure water | 73 parts by weight |

The foregoing various components were thoroughly mixed to make a solution which was then filtered through a filter having a pore diameter of 0.45 μm under pressure to prepare an ink. The ink thus prepared exhibited a viscosity of 2.0 mpas, a surface tension of 31 mN/m and a pH value of 7.9. The ink drop was 28 ng. The results of image quality test, anti-clogging test and dryability test were all good according to the foregoing evaluation criteria.

EXAMPLE 6

| | |
|---|---|
| C.I. Direct Yellow 144 | 2 parts by weight |
| Glycerin | 10 parts by weight |
| Triethylene glycol monobutyl ether | 10 parts by weight |
| Polyoxyethylene octylphenyl ether | 0.02 parts by weight |
| Styrene-ammonium methacrylate copolymer (average molecular weight: 9,500; styrene:methacrylic acid = 2:1) | 1.0 part by weight |
| N-acetylurea (vaporization weight: 75%) | 3 parts by weight |
| Pure water | 74 parts by weight |

The foregoing various components were thoroughly mixed to make a solution which was then filtered through a filter having a pore diameter of 0.45 μm under pressure to prepare an ink. The ink thus prepared exhibited a viscosity of 2.9 mPas, a surface tension-of 38 mN/m and a pH value of 8.8. The ink drop was 27 ng. The results of image quality test, anti-clogging test and dryability test were all good according to the foregoing evaluation criteria.

EXAMPLE 7

| | |
|---|---|
| Sodium salt of Compound (72) | 2 parts by weight |
| Sulfolane | 5 parts by weight |
| Glycerin | 10 parts by weight |
| Styrenesodium maleate copolymer (average molecular weight: 1,600; styrene:maleic acid = 1:1) | 3.0 parts by weight |
| Tetraethylene glycol monohexyl ether | 5 parts by weight |
| Urea (vaporization weight: 70%) | 3 parts by weight |
| Pure water | 72 parts by weight |

The foregoing various components were thoroughly mixed to make a solution which was then filtered through a filter having a pore diameter of 0.45 μm under pressure to prepare an ink. The ink thus prepared exhibited a viscosity of 2.8 mpas, a surface tension of 37 mN/m and a pH value of 8.8. The ink drop was 28 ng. The results of image quality test, anti-clogging test and dryability test were all good according to the foregoing evaluation criteria.

EXAMPLE 8

| | |
|---|---|
| Dye (Projet Fast Black-2, available from ZENEKA) | 3 parts by weight |
| 2-Pyrrolidone | 10 parts by weight |
| Ethyleneurea (vaporization weight: 98%) | 5 parts by weight |
| Dipropylene glycol monobutyl ether | 5 parts by weight |
| Florad FC-104 (nonionic fluorine surface active agent available from 3M) | 0.01 parts by weight |
| Isobutylene-sodium maleate copolymer (average molecular weight: 7,200; isobutylene:maleic acid = 2:1) | 1.0 part by weight |
| Pure water | 75 parts by weight |

The foregoing various components were thoroughly mixed to make a solution which was then filtered through a filter having a pore diameter of 0.45 μm under pressure to prepare an ink. The ink thus prepared exhibited a viscosity of 2.0 mPas, a surface tension of 28 mN/m and a pH value of 8.7. The ink drop was 27 ng. The results of image quality test, anti-clogging test and dryability test were all good according to the foregoing evaluation criteria.

EXAMPLE 9

| | |
|---|---|
| Ammonium salt of Compound (75) | 3 parts by weight |
| Dipropylene glycol | 15 parts by weight |
| Pluronic 3100 (oxyethylene oxypropylene block copolymer) | 1.5 parts by weight |
| Styrene-triethanolamine maleate copolymer (average inolecular weight: 1,800; styrene:maleic acid = 2:1) | 1.0 part by weight |
| N-methylurea (vaporization weight: 85%) | 3 parts by weight |
| Diethylene glycol monopentyl ether | 4 parts by weight |
| Pure water | 72 parts by weight |

The foregoing various components were thoroughly mixed to make a solution which was then filtered through a filter having a pore diameter of 0.45 μm under pressure to prepare an ink. The ink thus prepared exhibited a viscosity of 2.5 mPas, a surface tension of 34 mN/m and a pH value of 8.8. The ink drop was 26 ng. The results of image quality test, anti-clogging test and dryability test were all good according to the foregoing evaluation criteria.

EXAMPLE 10

| | |
|---|---|
| Lithium salt of Compound (17) | 3 parts by weight |
| 1,5-Pentanediol | 10 parts by weight |
| Diethylene glycol monohexyl ether | 5 parts by weight |
| Oxyethylene oleyl ether | 0.1 parts by weight |
| Urea (vaporization weight: 70%) | 2 parts by weight |
| Methyl methacrylate-sodium acrylate copolymer (average molecular weight: 9,500; methyl methacrylate acrylic acid = 1:2) | 1.5 parts by weight |
| Pure water | 78 parts by weight |

The foregoing various components were thoroughly mixed to make a solution which was then filtered through a filter having a pore diameter of 0.45 μm under pressure to prepare an ink. The ink thus prepared exhibited a viscosity of 2.1 mPas, a surface tension of 30 mN/m and a pH value of 8.6. The ink drop was 20 ng. The results of image quality test, anti-clogging test and dryability test were all good according to the foregoing evaluation criteria.

EXAMPLE 11

| | |
|---|---|
| Carbon black | 5 parts by weight |
| Acrylic acid-methacrylic acid-methyl methacrylate copolymer (acylic acid/methacrylic acid/ MMA = 1/1/2, average molecular weight: 7,000) | 1 part by weight |
| Diethylene glycol | 10 parts by weight |
| Surfynol 104 (tetramethyl decanediol) | 0.1 parts by weight |
| Styrene-sodium maleate copolymer (average molecular weight: 1,700; styrene:maleic acid = 2:1) | 2 parts by weight |
| Tetraethylene glycol monobutyl ether | 6 parts by weight |
| N,N'-dimethylurea (vaporization weight: 99%) | 8 parts by weight |
| Pure water | 68 parts by weight |

The foregoing carbon black, acrylic acid-methacrylic acid-methyl methacrylate copolymer and pure water were used to prepare a carbon black dispersion. The carbon black was then thoroughly mixed with the other components. The mixture was then filtered through a filter having a pore diameter of 1 μm under pressure to prepare an ink. The ink thus prepared exhibited a viscosity of 3.1 mpas, a surface tension of 32 mN/m and a pH value of 8.8. The ink drop was 30 ng. The results of image quality test, anti-clogging test and dryability test were all good according to the foregoing evaluation criteria.

EXAMPLE 12

| | |
|---|---|
| X-34 black dye, available from BASF | 1 part by weight |
| Ammonium salt of Compound (1) | 3 parts by weight |
| Thiodiethanol | 10 parts by weight |
| Lauryldimethylammonium oxide | 1.5 parts by weight |
| N,N'-diethylurea (vaporization weight: 80%) | 4 parts by weight |

-continued

| | |
|---|---|
| Hexylcarbitol | 5 parts by weight |
| Styrene-lithium maleate copolymer (average molecular weight: 2,200; styrene-:maleic acid = 2:1) | 1.5 parts by weight |
| Pure water | 74 parts by weight |

The foregoing various components were thoroughly mixed to make a solution which was then filtered through a filter having a pore diameter of 0.45 μm under pressure to prepare an ink. The ink thus prepared exhibited a viscosity of 2.3 mPas, a surface tension of 33 mN/m and a pH value of 8.6. The ink drop was 25 ng. The results of image quality test, anti-clogging test and dryability test were all good according to the foregoing evaluation criteria.

EXAMPLE 13

| | |
|---|---|
| Sodium salt of Compound (4) | 2 parts by weight |
| 2-Pyrrolidone | 5 parts by weight |
| Betaine (vaporization weight: 95%) | 7 parts by weight |
| Butyl ester methacrylate-lithium maleate copolymer (average molecular weight: 4,500; butyl ester methacrylate:maleic acid = 1:1) | 1.0 part by weight |
| Propylene glycol monobutyl ether | 5 parts by weight |
| Pure water | 80 parts by weight |

The foregoing various components were thoroughly mixed to make a solution which was then filtered through a filter having a pore diameter of 0.45 μm under pressure to prepare an ink. The ink thus prepared exhibited a viscosity of 1.9 mpas, a surface tension-of 37 mN/m and a pH value of 9.4. The ink drop was 28 ng. The results of image quality test, anti-clogging test and dryability test were all good according to the foregoing evaluation criteria.

EXAMPLE 14

| | |
|---|---|
| C.I. Acid Blue 9 | 4 parts by weight |
| Ethylene glycol | 10 parts by weight |
| Polysiloxane-polyoxyethylene adduct (average molecular weight: 7,000) | 0.5 parts by weight |
| Methacrylic acid-methylammonium methacrylate copolymer (average molecular weight: 5,500; methacrylic acid:methyl methacrylate = 2:1) | 0.7 parts by weight |
| Butyl carbitol | 3 parts by weight |
| Urea (vaporization weight: 70%) | 2 parts by weight |
| Pure water | 80 parts by weight |

The foregoing various components were thoroughly mixed to make a solution which was then filtered through a filter having a pore diameter of 0.45 μm under pressure to prepare an ink. The ink thus prepared exhibited a viscosity of 1.7 mpas, a surface tension of 29 mN/m and a pH value of 7.7. The ink drop was 25 ng. The results of image quality test and anti-clogging test were good and dryability test was fair according to the foregoing evaluation criteria.

EXAMPLE 15

| | |
|---|---|
| C.I. Pigment Red 122 | 5 parts by weight |
| Naphthalenesulfonic acid-formalin condensate (average molecular weight: 6,000) | 1.2 parts by weight |
| Diethylene glycol | 15 parts by weight |
| Surfynol 465 | 0.1 parts by weight |
| Urea (vaporization weight: 70%) | 10 parts by weight |
| Diethylene glycol monohexyl ether | 10 parts by weight |
| Styrene-sodium acrylate copolymer (average molecular weight: 4,800; styrene:acrylic acid = 1:2) | 0.1 parts by weight |
| Pure water | 60 parts by weight |

The foregoing pigment red 122, naphthalenesulfonic acid-formalin condensate and pure water were used to prepare a pigment dispersion. The carbon black was then thoroughly mixed with the other components. The mixture was then filtered through a filter having a pore diameter of 1 μm under pressure to prepare an ink. The ink thus prepared exhibited a viscosity of 1.7 mpas, a surface tension of 36 mN/m and a pH value of 8.5. The ink drop was 29 ng. The results of image quality test, anti-clogging test and dryability test were all good according to the foregoing evaluation criteria.

EXAMPLE 16

| | |
|---|---|
| Ammonium salt of Compound (38) | 4 parts by weight |
| Acrylic acid-propyl methacrylate copolymer (AC/PM = 7/3, average molecular weight = 8,000) | 1 part by weight |
| Glycerin | 6 parts by weight |
| Urea (vaporization weight: 70%) | 10 parts by weight |
| Styrene-lithium acrylate copolymer (average molecular weight: 6,500; styrene:acrylic acid = 1:2) | 0.9 parts by weight |
| Butyl carbitol | 4 parts by weight |
| Pure water | 74 parts by weight |

The foregoing various components were thoroughly mixed to make a solution which was then filtered through a filter having a pore diameter of 0.45 μm under pressure to prepare an ink. The ink thus prepared exhibited a viscosity of 2.3 mpas, a surface tension of 38 mN/m and a pH value of 8.6. The ink drop was 28 ng. The results of image quality test and anti-clogging test were good and dryability test was fair according to the foregoing evaluation criteria.

COMPARATIVE EXAMPLE 5

| | |
|---|---|
| C.I. Direct Black 168 | 4 parts by weight |
| Glycerin | 25 parts by weight |
| Styrene-sodium methacrylate copolymer (average molecular weight: 15,000; styrene:methacrylic acid = 1:1) | 2.5 parts by weight |
| Butyl carbitol | 7 parts by weight |
| Pure water | 62 parts by weight |

The foregoing various components were thoroughly mixed to make a solution which was then filtered through a filter having a pore diameter of 0.45 μm under pressure to prepare an ink. The ink thus prepared exhibited a viscosity of 4.1 mPas, a surface tension of 35 mN/m and a pH value of 8.3. The ink drop was 23 ng. The results of image quality tests b) and c) and dryability test were good according to the foregoing evaluation criteria. However, the results of image quality test a) and anti-clogging property test were fair according to the foregoing evaluation criteria. The results of image quality test d) were poor according to the foregoing evaluation criteria.

COMPARATIVE EXAMPLE 6

| | |
|---|---|
| C.I. Reactive Red 180 | 4 parts by weight |
| Diethylene glycol | 10 parts by weight |
| Carboxymethylcellulose (average molecular weight: 100,000) | 0.1 parts by weight |
| Oxyethylene laurylphenyl ether | 0.5 parts by weight |
| Diethylene glycol monohexyl ether | 2 parts by weight |
| Urea (vaporization weight: 70%) | 5 parts by weight |
| Pure water | 80 parts by weight |

The foregoing various components were thoroughly mixed to make a solution which was then filtered through a filter having a pore diameter of 0.45 μm under pressure to prepare an ink. The ink thus prepared exhibited a viscosity of 4.8 mPas, a surface tension of 37 mN/m and a pH value of 6.8. The ink drop was 17 ng. The results of image quality test c) were good according to the foregoing evaluation criteria. However, the results of image quality test a) and dryability were fair according to the foregoing evaluation criteria. The results of anti-clogging property test and image quality tests a) and d) were poor according to the foregoing evaluation criteria.

EXAMPLE 17

The four inks of Examples 1, 2, 3 and 7 were evaluated for the following properties:
Superimposed image quality test
Using a thermal ink jet printer having a resolution of 600 dpi made on an experimental basis for evaluation, 1 black dot line was printed on a color background on FX-L paper (available from Fuji Xerox Co., Ltd.) as a representative ordinary paper. Further, a solid image pattern composed of various colors disposed adjacent to each other was printed on the paper. For the evaluation of ink properties, line bleeding and uniformity in the area where two colors are adjacent to each other were examined. The evaluation was made according to the foregoing criteria:
a) Line bleeding
G: No bleeding; F: Slight bleeding; P: Whisker-like bleeding on many areas
b) Solid uniformity
G: No disorder; F: Slight disorder; P: Significant disorder, little smoothness
The results of the foregoing tests a) and b) were all good according to the foregoing evaluation criteria.

EXAMPLE 18

The four inks of Examples 6, 8, 9 and 10 were examined for superimposed image quality in the same manner as in Example 17.

The results of the foregoing tests a) and b) were all good according to the foregoing evaluation criteria.

EXAMPLE 19

| | |
|---|---|
| C.I. Food Black 2 | 3 parts by weight |
| Propylene glycol | 10 parts by weight |

-continued

| | |
|---|---|
| Oxyethylene oleylether | 0.5 parts by weight |
| Diethylene glycol monohexyl ether | 3 parts by weight |
| Styrene-lithium maleic anhydride copolymer (average molecular weight: 1,800; styrene:maleic anhydride = 2:1) | 1.0 part by weight |
| Urea (vaporization weight: 70%) | 7 parts by weight |
| Pure water | 79 parts by weight |

The foregoing various components were thoroughly mixed to make a solution which was then filtered through a filter having a pore diameter of 0.45 μm under pressure to prepare an ink. The ink thus prepared exhibited a viscosity of 2.0 mpas, a surface tension of 32 mN/m and a pH value of 8.7. Using a head made on an experimental basis for evaluation, the ink was measured for drop. The results were 55 ng. Using a thermal ink jet printer having a resolution of 400 dpi made on an experimental basis for evaluation, the ink was subjected to image quality test, anti-clogging property test and dryability test. The results of these tests were all good according to the foregoing evaluation criteria.

EXAMPLE 20

| | |
|---|---|
| Sodium salt of Compound (68) | 3 parts by weight |
| 1,2,6-Hexanetriol | 10 parts by weight |
| Diethylene glycol monobutyl ether | 5 parts by weight |
| Methacrylic acid-methyl methacrylate copolymer (average molecular weight: 4,800; methacrylic acid:methyl methacrylate = 1:1) | 1.5 parts by weight |
| N,N'-dimethylurea (vaporization weight: 99%) | 3 parts by weight |
| Pure water | 78 parts by weight |

The foregoing various components were thoroughly mixed to make a solution which was then filtered through a filter having a pore diameter of 0.45 μm under pressure to prepare an ink. The ink thus prepared exhibited a viscosity of 2.1 mPas, a surface tension of 35 mN/m and a pH value of 8.8 The ink drop was 24 ng. For the evaluation of ink properties, a driving signal composed of a 1 μsec prepulse, a 0.9 μsec interval and a 4 μsec main pulse was applied to form a droplet. Using a thermal ink jet printer having a resolution of 600 dpi made on an experimental basis for evaluation, the ink was subjected to image quality test, anti-clogging property test and dryability test. The results of these tests were all good according to the foregoing evaluation criteria.

Because of the foregoing constitution, the ink for ink jet recording of the present invention can dry rapidly on paper, provide a high density image free from bleeding and unevenness and cause no head clogging and disorder in jetting. Accordingly, the ink jet recording method according to the present invention can provide an image having a sufficient density free from bleeding and unevenness at a good reliability with respect to jetting.

While the invention has been described in detail and with reference to specific embodiments thereof, it will be apparent to one skilled in the art that various changes and modifications can be made therein without departing from the spirit and scope thereof.

What is claimed is:

1. An ink for ink jet-recording comprising water, a coloring material and a water-soluble organic solvent, wherein said ink comprises (1) from 0.1 to 3% by weight of a polymer containing a carboxyl group in the free or salt state, said polymer having a weight average molecular weight of from 1,000 to 20,000, (2) from 1 to 20% by weight of a water-soluble organic compound which normally stays solid and vaporizes in a proportion of not less than 50% by weight at a temperature of from 100° C. to 350° C., and (3) from 1 to 20% by weight of a compound represented by the following formula (A):

R—O—X$_n$H  (A)

wherein R represents a functional group selected from the group consisting of C$_{4-8}$ alkyl, alkenyl, alkinyl, phenyl, alkylphenyl, alkenylphenyl and cycloalkyl groups; X represents an oxyethylene or oxypropylene group; and n represents an integer of from 1 to 4, and wherein said ink exhibits a surface tension of from 20 to 40 mN/m and a pH value of not less than 7.5.

2. The ink for ink jet recording according to claim 1, wherein the weight average molecular weight of said polymer containing a carboxyl group in the free or salt state is from 1,500 to 10,000.

3. The ink for ink jet recording according to claim 1, wherein said polymer containing a carboxyl group in the free or salt state is a copolymer of a hydrophobic α,β-unsaturated ethylene monomer and a hydrophilic monomer containing a carboxyl group in the free or salt state.

4. The ink for ink jet recording according to claim 3, wherein said hydrophobic α,β-unsaturated ethylene monomer is at least one monomer selected from the group consisting of styrene, acrylic ester, methacrylic ester and maleic ester.

5. The ink for ink jet recording according to claim 3, wherein said hydrophilic monomer is at least one monomer selected from the group consisting of acrylic acid, methacrylic acid and maleic acid.

6. The ink for ink jet recording according to claim 3, wherein the ratio of said hydrophobic α,β-unsaturated ethylene monomer to said hydrophilic monomer containing a carboxyl group in the free or salt state is from 4:1 to 1:4 by mol.

7. The ink for ink jet recording according to claim 1, wherein the added amount of said polymer containing a carboxyl group in the free or salt state is from 0.5 to 1.5% by weight.

8. The ink for ink jet recording according to claim 1, wherein said coloring material is a water-soluble anionic dye.

9. The ink according to claim 8, wherein the water-soluble anionic dye is present in an amount of from 0.1 to 20% by weight.

10. The ink for ink jet recording according to claim 8, wherein said water-soluble anionic dye contains as a functional group a carboxyl group in the free or salt state.

11. The ink for ink jet recording according to claim 1, wherein the added amount of-said compound represented by formula (A) is from 2 to 10% by weight.

12. The ink for ink jet recording according to claim 1, which dries on an ordinary paper in not more than 5 seconds.

13. The ink for ink jet recording according to claim 1, which has a pH value of from 8 to 10.

14. The ink for ink jet recording according to claim 1, wherein said water-soluble organic compound which normally stays solid and vaporizes in a proportion of not less than 50% by weight at a temperature of from 100° C. to 350° C. is urea.

15. The ink for ink jet recording according to claim 1, which has a viscosity of from 1.5 to 5 mPas.

16. The ink for ink jet recording according to claim 1, which has a surface tension of from 25 to 38 mN/m.

17. The ink according to claim 1, wherein the water is present in an amount of from about 72 to about 83 parts by weight.

18. The ink according to claim 1, wherein the coloring material is a pigment.

19. The ink according to claim 1, wherein the water-soluble organic solvent is present in an amount of from about 1.0 to 60.0% by weight.

20. An ink jet recording method which comprises jetting a droplet of an ink comprising water, a coloring material and a water-soluble organic solvent through an orifice in response to a recording signal, wherein said ink comprises (1) from 0.1 to 3% by weight of a polymer containing a carboxyl group in the free or salt state, said polymer having a weight average molecular weight of from 1,000 to 20,000, (2) from 1 to 20% by weight of a water-soluble organic compound which normally stays solid and vaporizes in a proportion of not less than 50% by weight at a temperature of from 100° C. to 350° C., and (3) from 1 to 20% by weight of a compound represented by the following formula (A):

$$R\text{—}O\text{—}X_nH \quad (A)$$

wherein R represents a functional group selected from the group consisting of $C_{4-8}$ alkyl, alkenyl, alkinyl, phenyl, alkylphenyl, alkenylphenyl and cycloalkyl groups; X represents an oxyethylene or oxypropylene group; and n represents an integer of from 1 to 4, and wherein said ink exhibits a surface tension of from 20 to 40 mN/m and a pH value of not less than 7.5.

21. The ink jet recording method according to claim 20, wherein the amount of said ink to be jetted per droplet is from 1 to 70 ng.

22. The ink jet recording method according to claim 20, further comprising a heating process to jet said ink.

23. The ink jet recording method according to claim 22, wherein said jetting is in accordance with a plurality of pulses that forms droplets.

* * * * *